US008392836B1

(12) United States Patent
Bau et al.

(10) Patent No.: US 8,392,836 B1
(45) Date of Patent: Mar. 5, 2013

(54) PRESENTING QUICK LIST OF CONTACTS TO COMMUNICATION APPLICATION USER

(75) Inventors: David Bau, Gladwyne, PA (US); Jonathan David Perlow, Seattle, WA (US)

(73) Assignee: Google Inc., Mountain View, CA (US)

( * ) Notice: Subject to any disclaimer, the term of this patent is extended or adjusted under 35 U.S.C. 154(b) by 1030 days.

(21) Appl. No.: 11/180,035

(22) Filed: Jul. 11, 2005

(51) Int. Cl.
*G06F 3/00* (2006.01)

(52) U.S. Cl. ........................................ 715/739; 715/752

(58) Field of Classification Search .................. 715/752, 715/759, 758, 748, 749, 802, 804, 805, 739, 715/738, 968, 853–854, 762–763, 864, 821, 715/845; 707/6, 102, 3, 104.1; 709/206, 709/207, 229, 204
See application file for complete search history.

(56) References Cited

U.S. PATENT DOCUMENTS

| | | | | |
|---|---|---|---|---|
| 5,179,700 | A | | 1/1993 | Aihara et al. ................. 395/650 |
| 5,227,771 | A | | 7/1993 | Kerr et al. ...................... 340/731 |
| 5,870,090 | A | | 2/1999 | Takai et al. .................... 345/340 |
| 5,889,474 | A | | 3/1999 | LaDue ..................... 340/825.49 |
| 5,940,077 | A | | 8/1999 | Amro ............................ 345/342 |
| 6,072,875 | A | * | 6/2000 | Tsudik ........................... 380/270 |
| 6,141,008 | A | | 10/2000 | Bloomfield .................... 345/340 |
| 6,240,402 | B1 | * | 5/2001 | Lynch-Aird .................. 705/400 |
| 6,269,369 | B1 | | 7/2001 | Robertson ....................... 707/10 |
| 6,385,619 | B1 | | 5/2002 | Eichstaedt et al. ............ 707/104 |
| 6,414,698 | B1 | | 7/2002 | Lovell et al. .................. 715/800 |
| 6,487,584 | B1 | * | 11/2002 | Bunney ......................... 709/206 |
| 6,549,937 | B1 | * | 4/2003 | Auerbach et al. ............. 709/206 |
| 6,584,471 | B1 | | 6/2003 | Maclin et al. .............. 707/104.1 |
| 6,725,461 | B1 | | 4/2004 | Dougherty et al. | |
| 6,751,657 | B1 | | 6/2004 | Zothner ......................... 709/220 |
| 6,804,558 | B2 | | 10/2004 | Haller et al. ..................... 607/30 |
| 6,813,489 | B1 | * | 11/2004 | Wu et al. ..................... 455/412.1 |
| 6,829,646 | B1 | | 12/2004 | Philyaw et al. ............... 709/228 |
| 6,832,245 | B1 | | 12/2004 | Isaacs et al. .................. 709/206 |
| 6,901,559 | B1 | | 5/2005 | Blum et al. .................... 715/811 |
| 6,909,439 | B1 | | 6/2005 | Amro et al. ................... 345/660 |
| 6,925,605 | B2 | | 8/2005 | Bates et al. .................... 715/745 |
| 6,965,855 | B1 | * | 11/2005 | Burbridge et al. ............. 703/22 |
| 6,968,179 | B1 | | 11/2005 | De Vries ..................... 455/414.1 |
| 7,007,239 | B1 | | 2/2006 | Hawkins et al. .............. 715/780 |
| 7,133,859 | B1 | * | 11/2006 | Wong ............................... 707/2 |
| 7,149,773 | B2 | | 12/2006 | Haller et al. .................. 709/203 |
| 7,216,302 | B2 | | 5/2007 | Rodden et al. ................ 715/815 |
| 7,234,117 | B2 | | 6/2007 | Zaner et al. ................... 715/758 |
| 7,243,075 | B1 | | 7/2007 | Shaffer et al. | |

(Continued)

OTHER PUBLICATIONS

"Extensible Messaging and Presence Protocol (XMPP): Instant Messaging and Presence," P. Saint-Andre, Ed., Jabber Software Foundation, Oct. 2004, pp. 1-90.

*Primary Examiner* — Steven Sax
(74) *Attorney, Agent, or Firm* — Morgan, Lewis & Bockius LLP

(57) ABSTRACT

Methods and systems of presenting a quick list of contacts to an instant messaging user are disclosed. A set of contacts is identified. From the set of contacts, a first subset is selected based on first predefined criteria and a second subset is selected from second predefined criteria. The first and second predefined criteria may include contact interaction criteria, user activity criteria, and connectedness criteria. From the first and second subsets, one or more lists of contacts are generated. The one or more lists may be displayed in a display region of an instant messaging application.

48 Claims, 13 Drawing Sheets

U.S. PATENT DOCUMENTS

| | | | |
|---|---|---|---|
| 7,281,215 B1 | 10/2007 | Canfield et al. | 715/752 |
| 7,305,398 B2 | 12/2007 | Teicher | |
| 7,313,760 B2* | 12/2007 | Grossman et al. | 715/708 |
| 7,343,365 B2 | 3/2008 | Farnham et al. | 707/1 |
| 7,346,694 B2 | 3/2008 | Philyaw et al. | 709/228 |
| 7,360,174 B2* | 4/2008 | Grossman et al. | 715/854 |
| 7,370,290 B2* | 5/2008 | Grossman et al. | 715/864 |
| 7,379,848 B2 | 5/2008 | Yu et al. | |
| 7,506,026 B1 | 3/2009 | Lance et al. | |
| 7,680,895 B2* | 3/2010 | Perlow et al. | 709/207 |
| 7,685,236 B1* | 3/2010 | Harik et al. | 709/205 |
| 7,698,380 B1 | 4/2010 | Amidon et al. | 709/218 |
| 7,716,287 B2 | 5/2010 | Appelman et al. | 709/205 |
| 7,730,010 B2 | 6/2010 | Kishore et al. | |
| 7,747,631 B1 | 6/2010 | Puzicha et al. | 707/748 |
| 7,783,644 B1 | 8/2010 | Petrou et al. | 707/748 |
| 2001/0051787 A1 | 12/2001 | Haller et al. | 604/66 |
| 2002/0013613 A1 | 1/2002 | Haller et al. | 607/60 |
| 2002/0019825 A1 | 2/2002 | Smiga et al. | 707/102 |
| 2002/0052539 A1 | 5/2002 | Haller et al. | 600/300 |
| 2002/0059425 A1 | 5/2002 | Belfiore et al. | 709/226 |
| 2002/0073207 A1 | 6/2002 | Widger et al. | 709/227 |
| 2002/0077116 A1 | 6/2002 | Havinis et al. | 455/456 |
| 2002/0082665 A1 | 6/2002 | Haller et al. | 607/60 |
| 2002/0087522 A1 | 7/2002 | MacGregor et al. | 707/3 |
| 2002/0116336 A1 | 8/2002 | Diacakis et al. | 705/51 |
| 2002/0116461 A1 | 8/2002 | Diacakis et al. | 709/204 |
| 2002/0120687 A1 | 8/2002 | Diacakis et al. | 709/204 |
| 2002/0120774 A1 | 8/2002 | Diacakis | 709/245 |
| 2002/0178022 A1 | 11/2002 | Anderson et al. | 705/1 |
| 2002/0184321 A1 | 12/2002 | Fishman et al. | 709/206 |
| 2003/0018704 A1 | 1/2003 | Polychronidis et al. | 709/202 |
| 2003/0041048 A1 | 2/2003 | Balasuriya | 707/1 |
| 2003/0065721 A1 | 4/2003 | Roskind | 709/204 |
| 2003/0073440 A1* | 4/2003 | Mukherjee et al. | 455/435 |
| 2003/0119540 A1* | 6/2003 | Mathis | 455/518 |
| 2003/0208545 A1* | 11/2003 | Eaton et al. | 709/206 |
| 2004/0032340 A1* | 2/2004 | Lingafeldt et al. | 340/870.02 |
| 2004/0053605 A1* | 3/2004 | Martyn et al. | 455/418 |
| 2004/0056901 A1 | 3/2004 | March et al. | 345/811 |
| 2004/0059781 A1 | 3/2004 | Yoakum et al. | 709/204 |
| 2004/0088221 A1* | 5/2004 | Katz et al. | 705/14 |
| 2004/0113952 A1 | 6/2004 | Randall | 345/830 |
| 2004/0119732 A1* | 6/2004 | Grossman et al. | 345/708 |
| 2004/0119760 A1 | 6/2004 | Grossman et al. | 345/854 |
| 2004/0162883 A1 | 8/2004 | Oreizy et al. | 709/207 |
| 2004/0172455 A1 | 9/2004 | Green et al. | 709/207 |
| 2004/0172456 A1 | 9/2004 | Green et al. | 709/207 |
| 2004/0196315 A1 | 10/2004 | Swearingen et al. | 345/804 |
| 2004/0210844 A1* | 10/2004 | Pettinati et al. | 715/708 |
| 2004/0243941 A1 | 12/2004 | Fish | 715/752 |
| 2004/0260749 A1 | 12/2004 | Trossen et al. | 709/200 |
| 2005/0076013 A1* | 4/2005 | Hilbert et al. | 707/3 |
| 2005/0080855 A1* | 4/2005 | Murray | 709/206 |
| 2005/0080856 A1* | 4/2005 | Kirsch | 709/206 |
| 2005/0091272 A1* | 4/2005 | Smith et al. | 707/104.1 |
| 2005/0165920 A1 | 7/2005 | Kerr et al. | 709/223 |
| 2005/0198131 A1 | 9/2005 | Appelman et al. | 709/204 |
| 2005/0198172 A1* | 9/2005 | Appelman et al. | 709/206 |
| 2005/0203929 A1 | 9/2005 | Hazarika et al. | 707/100 |
| 2005/0265296 A1 | 12/2005 | Zhang et al. | 370/338 |
| 2005/0267944 A1* | 12/2005 | Little | 709/207 |
| 2006/0004585 A1 | 1/2006 | Shukosky et al. | 705/1 |
| 2006/0010104 A1* | 1/2006 | Pettinati et al. | 707/3 |
| 2006/0031366 A1 | 2/2006 | Dolph | 709/207 |
| 2006/0031772 A1 | 2/2006 | Valeski | 715/751 |
| 2006/0035632 A1* | 2/2006 | Sorvari et al. | 455/418 |
| 2006/0047747 A1 | 3/2006 | Erickson et al. | 709/204 |
| 2006/0069727 A1* | 3/2006 | Fuller et al. | 709/206 |
| 2006/0074932 A1 | 4/2006 | Fong et al. | |
| 2006/0084478 A1* | 4/2006 | Erlichmen | 455/566 |
| 2006/0085752 A1 | 4/2006 | Beadle et al. | 715/751 |
| 2006/0101266 A1* | 5/2006 | Klassen et al. | 713/170 |
| 2006/0117380 A1* | 6/2006 | Tachizawa et al. | 726/4 |
| 2006/0136836 A1 | 6/2006 | Clee et al. | 715/781 |
| 2006/0161853 A1* | 7/2006 | Chen et al. | 715/758 |
| 2006/0173963 A1 | 8/2006 | Roseway et al. | 709/206 |
| 2006/0184896 A1 | 8/2006 | Foucher et al. | 715/810 |
| 2006/0209690 A1* | 9/2006 | Brooke | 370/230 |
| 2006/0229896 A1* | 10/2006 | Rosen et al. | 705/1 |
| 2006/0241955 A1* | 10/2006 | Bank | 705/1 |
| 2006/0259956 A1 | 11/2006 | Diacakis et al. | |
| 2006/0271870 A1 | 11/2006 | Anwar | 715/764 |
| 2006/0277282 A1 | 12/2006 | Christensen et al. | 709/223 |
| 2007/0027919 A1 | 2/2007 | Mastel | 707/104.1 |
| 2007/0055742 A1* | 3/2007 | Hebert et al. | 709/217 |
| 2007/0118809 A1 | 5/2007 | Ozugur et al. | 715/776 |
| 2007/0135110 A1* | 6/2007 | Athale et al. | 455/418 |
| 2007/0198696 A1 | 8/2007 | Morris | 709/224 |
| 2007/0198725 A1 | 8/2007 | Morris | 709/227 |
| 2008/0022215 A1 | 1/2008 | Lee et al. | 715/762 |
| 2008/0040687 A1 | 2/2008 | Randall | 715/830 |
| 2008/0046281 A1 | 2/2008 | Teicher | |
| 2008/0046282 A1 | 2/2008 | Teicher | |
| 2008/0046803 A1 | 2/2008 | Beauchamp et al. | 715/212 |
| 2009/0089316 A1 | 4/2009 | Kogan et al. | 707/102 |
| 2009/0106059 A1 | 4/2009 | Megiddo et al. | |
| 2010/0070345 A1* | 3/2010 | Abelow | 705/10 |
| 2010/0082693 A1 | 4/2010 | Hugg et al. | |
| 2010/0191740 A1 | 7/2010 | Lu et al. | 707/748 |
| 2010/0223211 A1 | 9/2010 | Johnson et al. | 706/11 |
| 2010/0290603 A1 | 11/2010 | Gemayel et al. | |
| 2012/0047129 A1 | 2/2012 | Redstone et al. | |
| 2012/0102126 A1 | 4/2012 | Murphy et al. | |

* cited by examiner

Figure 4C

Contact Record 424

- 432 — Contact y ID
- 434 — Name
- 436 — Long-term Score
- 438 — Short-term Score
- 440 — Email
- 442 — Phone
- 444 — Home
- 446 — Home Email
- 448 — Home Phone
- 450 — Work
- 452 — Work Email
- 454 — Work Phone

Figure 4D

- 462 — User ID
- 464 — Location
- 466 — Status
- 468 — Status Message
- 463

PRESENTING QUICK LIST OF CONTACTS TO COMMUNICATION APPLICATION USER

TECHNICAL FIELD

The disclosed embodiments relate generally to electronic messaging applications. More particularly, the disclosed embodiments relate to presentation of a quick list of contacts to a messaging application user (e.g., an instant messaging user).

BACKGROUND

Instant messaging (also known as "IM") is becoming a popular form of online communication. Several IM client applications are currently available. Examples of IM clients include AOL INSTANT MESSENGER ("AIM"), YAHOO MESSENGER, MSN MESSENGER, ICQ, GAIM, and TRILLIAN. Through IM, a user can communicate, in real time, with other users that are in her list of IM contacts.

One issue with IM clients is that a user may have many more contacts than that can be displayed in an IM client window. Generally, if the number of total contacts is more than that can be displayed in an IM client window, the IM client window may display a subset of the contacts and have the user scroll in the window to find contacts that are not in view. Some IM clients allow a user to configure which contacts are to be displayed, such as contacts that are online or contacts in particular groups or folders. Some IM clients can also be configured to move to the top of a user contact list the user who last sent a message to the user.

These methods of displaying a user's contacts have drawbacks. Managing groups of contacts can be cumbersome. Even if an IM client is configured to display only online contacts or contacts in particular groups, if the user has many contacts, the user may still be forced to scroll in the window to find contacts that are not displayed. Furthermore, the contacts displayed may not be the contacts in which a user is interested.

Accordingly, it is highly desirable to provide a more user-friendly method of presenting contacts in an IM client window.

SUMMARY

According to an aspect of the invention, a method of selecting contacts for presentation in a display region includes identifying a set of contacts; selecting a first subset of the contacts based on first predefined criteria, the first predefined criteria comprising contact interaction criteria; selecting a second subset of the contacts excluding the first subset based on second predefined criteria, the second predefined criteria comprising online status criteria and the contact interaction criteria; and generating for presentation in a display region one or more lists of contacts from the first and second subsets of the contacts, including combining and reordering the first and second subsets of the contacts.

According to another aspect of the invention, a method of selecting contacts for presentation in a display region includes identifying a set of contacts; selecting a first subset of the contacts based on first predefined criteria, the first predefined criteria comprising contact interaction criteria; selecting a second subset of the contacts based on second predefined criteria; and generating for presentation in a display region one or more lists of contacts from the first and second subsets of the contacts.

BRIEF DESCRIPTION OF THE DRAWINGS

FIGS. 4A-4D illustrate data structures residing in a messaging server, according to some embodiments of the invention.

Like reference numerals refer to corresponding parts throughout the drawings.

DESCRIPTION OF EMBODIMENTS

Figure 1A:
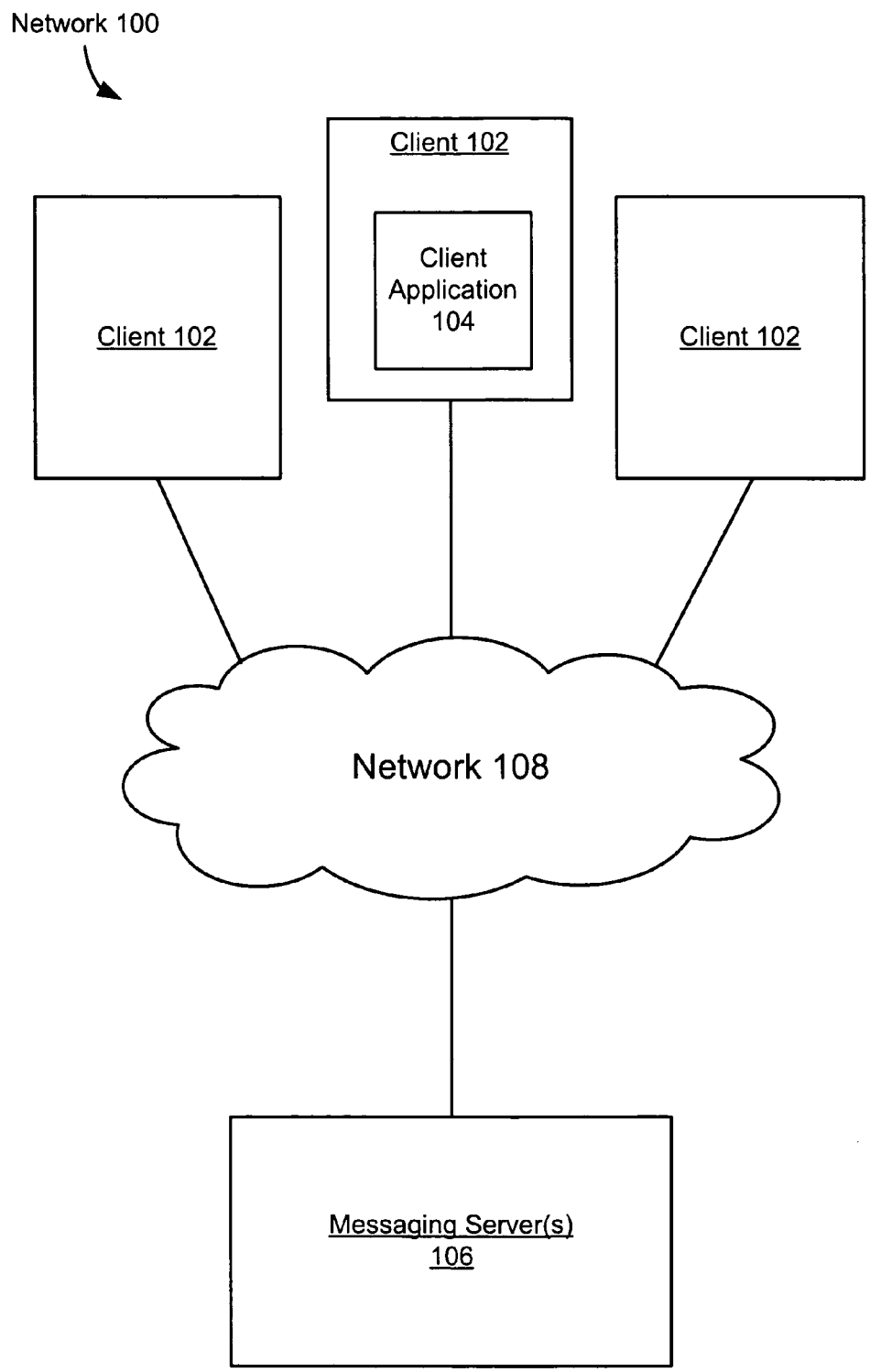
FIGS. 1A-1B are block diagrams illustrating networks, according to some embodiments of the invention.
Figure 1B:
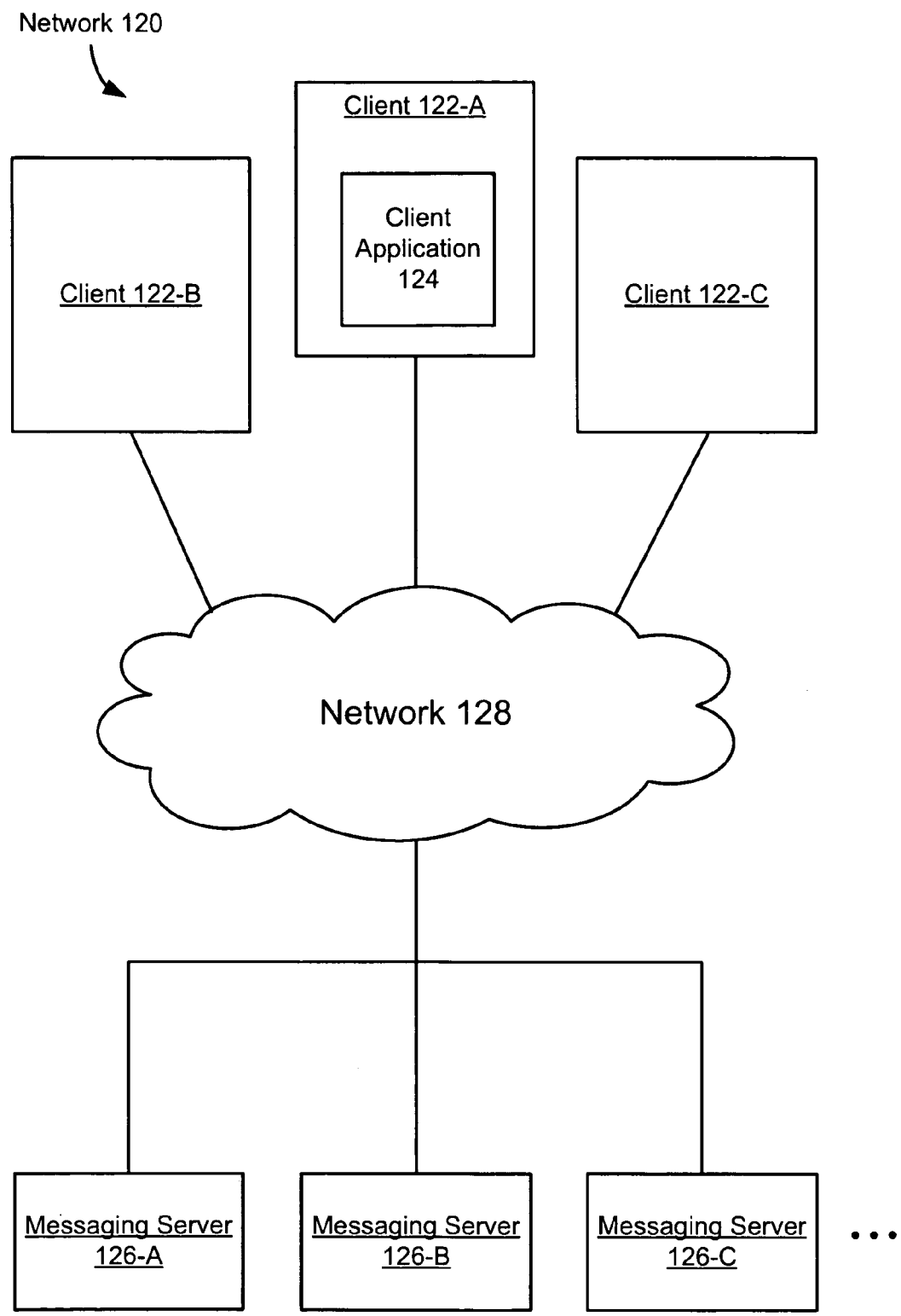

FIGS. 1A and 1B are block diagrams illustrating networks, according to some embodiments of the invention. In FIG. 1A, the network 100 includes one or more clients 102, one or more messaging servers 106, and one or more networks 108 that couple these components. The client 102 may be any communications device or computer, including but not limited to, desktop computers, laptop computers, personal digital assistants (PDAs), mobile phones, network terminals, and so forth. The network(s) 108 may include, without limitation, local area networks (LAN), wide area networks (WAN), wired or wireless networks, mobile phone networks, and the Internet.

The client 102 includes a client application 104. The client application 104 may be any program, module, instructions, or the like, that sends and receives documents between clients 102. A document may be any type of machine-readable data, which may include any combination of text, graphics, video, audio, etc. In some embodiments, the client application 104 is a communication application such as messaging application and the documents are messages. Examples of messages include, without limitation, email messages and instant messaging messages. Examples of messaging applications include, without limitation, email applications and instant messaging applications. For convenience of explanation, the description below will describe the clients and messaging servers 106 as sending and receiving messages. Alternately, the client application may be a communication application such as a telephone or VoIP (voice over IP) application for handling telephone or audio communications.

One or more messaging servers 106 provide messaging services to clients 102. The messaging servers 106 store information associated with the users of the service, user status information, and address books of users, further details of which are described below, in relation to FIGS. 4A-4D. In some embodiments, the messaging servers 106 store and relay messages to and from clients 102. In some other embodiments, the messaging servers 106 provide information to be used by a client to directly connect to another client. The messaging servers 106 and clients 102 may utilize any of a plurality of messaging protocols, including but not limited to Simple Mail Transfer Protocol (SMTP), Post Office Protocol version 3 (POP3), Internet Relay Chat (IRC), OSCAR, JABBER, etc.

In some embodiments, the messaging servers 106 monitor and manage the status information of the users of the messaging service. Whenever a client application associated with a user of the messaging service is not running on a client or is running but is otherwise not in communication with the messaging servers 106, the user is considered to be offline. If the client application is running and is in communication with the messaging servers 106; the user is considered to be online. Whenever a user goes from offline to online, the client application 104 sends a message to the messaging servers 106 announcing the change in status. The messaging servers 106 update the status information associated with the user to reflect the status change. The messaging servers 106 may forward the status of a user A to a client application associated with a user B who is interested in the status of user A. In some embodiments, the status of user A is forwarded to user B and other users by a broadcast or multicast message.

The status information monitored by the messaging servers 106 may be further refined. One or more predefined statuses may be provided and serve as a default set of statuses. One or more status messages, which are text strings that describe the status in further detail, may be associated with the predefined statues. The client application may be set to any one of the predefined statuses by user intervention or as an automatic response to particular events. The predefined statuses serve to indicate in greater detail the user's willingness and/or availability to exchange messages with other users.

In some embodiments, the predefined user statuses may include "active," "idle," "busy," "chatty," and offline. "Active" means that the user is available to send and/or receive messages. "Idle" (or "away") means that the user has not been actively using the client for at least a specified amount of time, and by implication, is away from the client. "Busy" means that the user is preoccupied with other matters and is not available for sending and/or receiving messages. "Chatty" means that the user is actively sending and/or receiving messages and may be willing to send and/or receive more. "Offline" means that the user is offline, as described above. A user that is "active," "idle," "busy," or "chatty" is also online because the client application 104 is running and in communication with the messaging servers 106.

It should be appreciated that the statuses described above are merely exemplary. Additional and/or alternative statuses may also be used.

In some embodiments, a user may also define custom statuses and/or custom status messages. For example, a user may define a custom status message saying that she is "on vacation."

The messaging servers 106 may also store, for each user of the messaging service, an address book (or a buddy list, contact list, or the like). The address book is a roster of one or more contacts associated with the user. A contact is a person with whom the user has previously communicated (by email, voice, IM, and so on) or with whom the user may wish to choose to communicate. The address book associates contacts with one or more communication addresses or locators (email address, IM address, phone number, and so on) as well as other information such as a name or profile. A contact may or may not participate in the same IM network as the user and therefore may or may not be reachable over IM. Further information regarding the address book is described below, in relation to FIGS. 4A-4D.

In some embodiments, particular messaging servers may be assigned to monitor and store the status information and address books of a particular subset of users. An example of this configuration is illustrated in FIG. 1B. In FIG. 1B, the network 120 includes clients 122-A, 122-B, and 122-C, each associated with a different user. Each client may include one or more client applications 124. The network 120 also includes messaging servers 126-A, 126-B, and 126-C, and a network 128 that couples these components.

Each messaging server 126-A, 126-B, 126-C is assigned a subset of users. For example, messaging server 126-A is assigned the user of client 122-A, messaging server 126-B is assigned the user of client 122-B, and messaging server 126-C is assigned the user of client 122-C. Whenever a user goes from offline to an online status, the client application associated with that user sends a message informing its corresponding messaging server of its status change. The messaging server receives that message, updates the status of the user, and forwards the new status to other interested messaging servers.

Figure 1C:
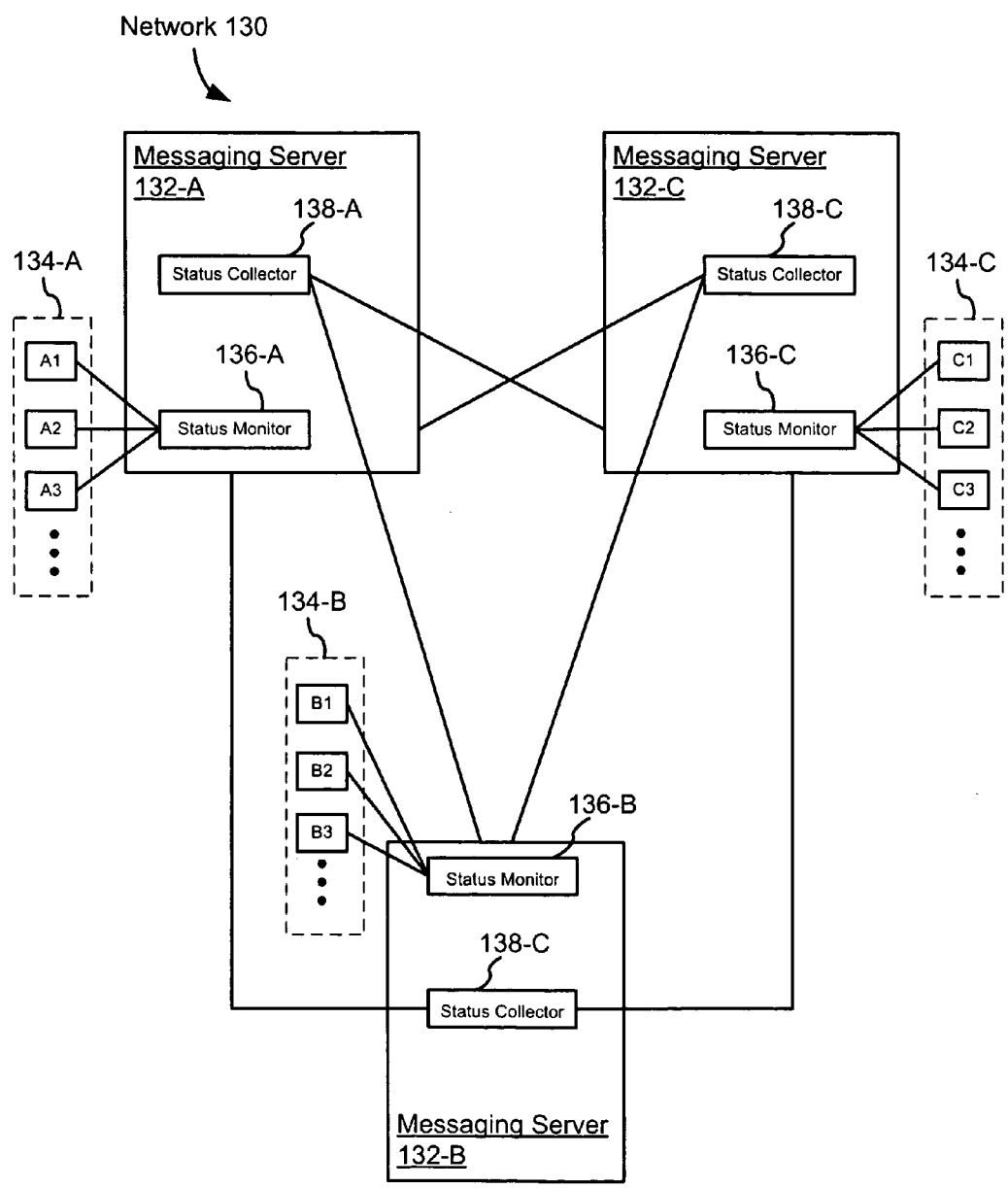
FIG. 1C is a block diagram illustrating a network of messaging servers, according to some embodiments of the invention.

FIG. 1C is a block diagram illustrating a network of messaging servers, according to some embodiments of the invention. FIG. 1C illustrates an embodiment of a logical coupling of the messaging servers to each other and to clients for monitoring and reporting the statuses of the users on the clients. The network 130 includes messaging servers 132-A, 132-B, and 132-C. The network 130 may include more or fewer messaging servers than what is shown in FIG. 1C. Each messaging server is assigned a set of one or more users. Messaging server 132-A is assigned users 134-A. Messaging server 132-B is assigned users 134-B. Messaging server 132-C is assigned users 134-C. Each messaging server includes a status monitor and a status collector. Thus, messaging server 132-A includes a status monitor 136-A and a status collector 138-A. Messaging server 132-B includes a status monitor 136-B and a status collector 138-B. Messaging server 132-C includes a status monitor 136-C and a status collector 138-C. In some other embodiments, each of the messaging servers has one status monitor and one status collector per user that is assigned to the respective messaging server.

Whenever user goes from offline to online (e.g., by logging in at the client application), the client application sends a message to the network 130 announcing that it is online. In some embodiments, this message is routed to the messaging server assigned to the user, and the other messaging servers will not receive this message directly because it came from a user not assigned to them. The status monitor at the messaging server to which the user is assigned receives the message and changes the status of that user to "online" (or "active," "busy," or whatever status is appropriate). Furthermore, the status collector at the messaging server gathers the statuses of the contacts in that user's address book. While some of the contacts in the user's address book may be assigned to the same message server, other contacts in the user's address book are assigned to other message servers. The status collector assigned to the user gathers the statuses of the user's contacts, including those assigned to other messaging servers, and forwards at least a portion of the collected status information to the user. In some embodiments, the status collector broadcasts requests for status information of the contacts to the network and the messaging servers to which the contacts are assigned respond to the requests. In some other embodiments, the status collector determines the messaging servers to which the contacts are assigned and sends requests for status information to those messaging servers. In some embodiments, the contact assignments may be determined by reference to an index of all users, a copy of which may be stored in all of the messaging servers or a subset thereof, and their messaging server assignments.

For example, if a user A1 of users 134-A, assigned to messaging server 132-A, goes from offline to online, the client application associated with the user A1 sends a message to the network 130 announcing that user A1 is online. The status monitor 136-A at the messaging server 132-A receives the message (the other messaging servers 132-B and 132-C will not receive it) and updates the status of the user A1 to online. The status collector 138-A at the messaging server 132-A obtains a list of the contacts in the user A1's address book, for instance by accessing user A1's address book. Using that list of contacts, the status collector 138-A gathers status information from the messaging servers to which the contacts are assigned. Thus, if a contact is assigned to messaging server 132-A, then the status collector 138-A accesses the contact's status information stored at messaging server 132-A. If the contact is assigned to messaging server 132-B, then it communicates with messaging server 132-B to get the status information. A similar procedure occurs if the contact is assigned to messaging server 132-C.

Figure 2:
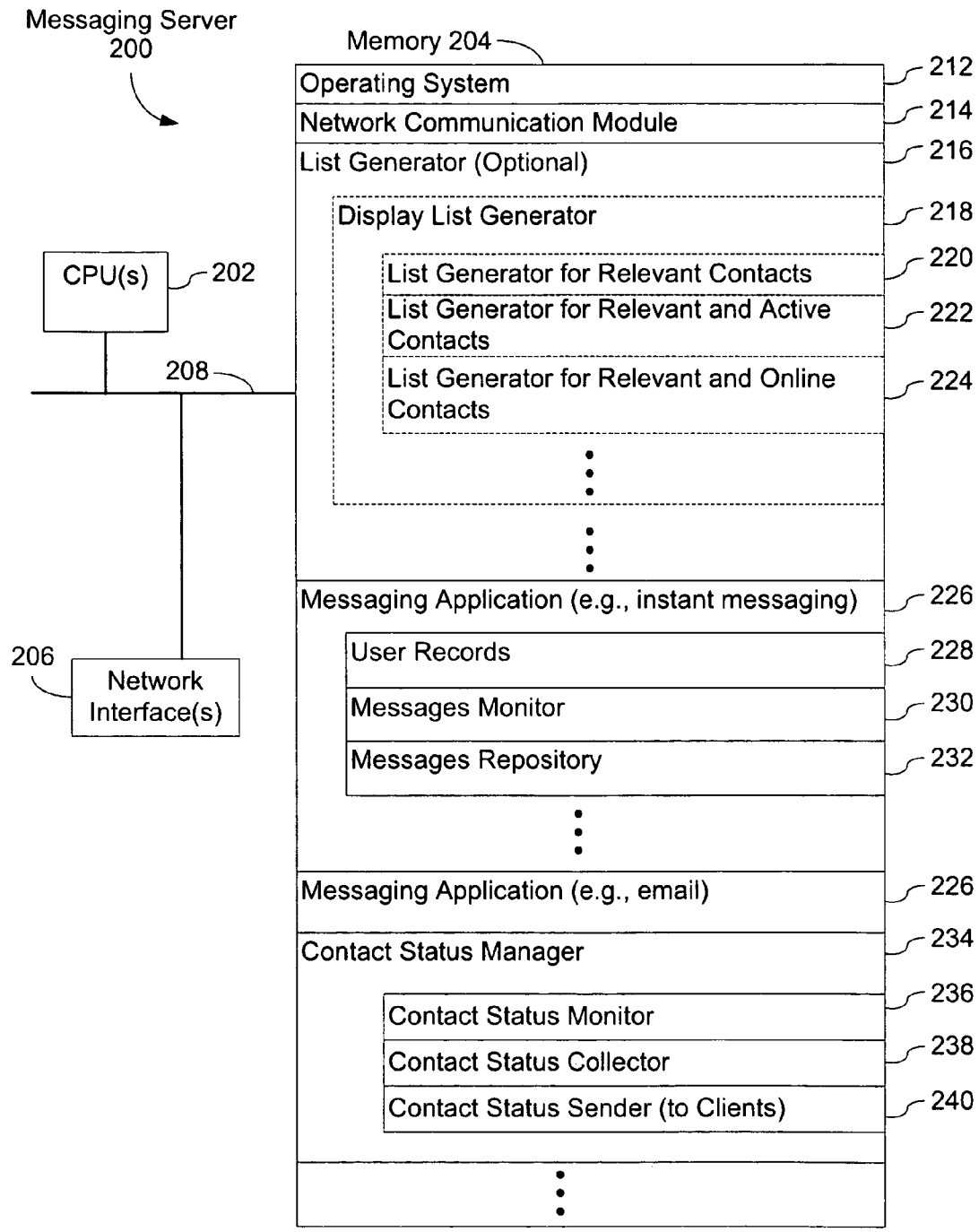
FIG. 2 is a block diagram illustrating a messaging server, according to some embodiments of the invention.

FIG. 2 is a block diagram illustrating a messaging server, according to some embodiments of the invention. The messaging server 200 typically includes one or more processing units (CPU's) 202, one or more network or other communications interfaces 206, memory 204, and one or more communication buses 208 for interconnecting these components. The messaging server 200 optionally may include a user interface (not shown), which may include a display device, a keyboard, and/or a mouse. Memory 204 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 204 may optionally include one or more storage devices remotely located from the CPU(s) 202. Memory 204, or alternatively one or more storage devices (e.g., one or more nonvolatile storage devices) within memory 204, includes a computer readable storage medium. In some embodiments, the computer readable storage medium stores the following programs, modules and data structures, or a subset thereof:

- an operating system 212 that includes procedures for handling various basic system services and for performing hardware dependent tasks;
- a network communication module 214 that is used for connecting the messaging server 200 to other computers via the one or more communication network interfaces 206 (wired or wireless) to one or more communication networks, such as the Internet, other wide area networks, local area networks, metropolitan area networks, and so on;
- an optional list generator 216 for generating lists of contacts;
- one or more messaging applications 226, such as an instant messaging application or an email application; and
- a contact status manager 234 for managing statuses of users.

The list generator may include a display list generator 218, which generates lists of contacts for presentation in the display region of a client application. The display list generator 218 includes a list generator for relevant contacts 220, a list generator for relevant and active contacts 222, and a list generator for relevant and online contacts 224. The list generator for relevant contacts 220 generates a list of contacts that are relevant, but not necessarily active or even online at all. "Relevant," as used herein, means that the user has had interaction with the contact. Interaction may include, but is not limited to, message exchanges, scheduled meetings, transfers and/or sharing of files (such as digital images), and explicitly adding a contact to the address book. As discussed in more detail below, the list of relevant contacts may be selected in accordance with a scoring function that associates a score with each contact based on the quantity, type and age of the interactions between the contact and the user. The score is sometimes herein called a contact interaction score. The list generator for relevant and active contacts 222 generates a list of contacts that are relevant and "active" (or relevant and "chatty"). The list generator for relevant and online contacts 224 generates a list of contacts that are relevant and not offline. In some embodiments, the list generator may also include list generator modules for generating lists of relevant contacts who are offline and generating lists of relevant contacts who have nonempty status messages. The lists are sent to a client application for display in the display region of the client application.

The messaging application 226 may include user records 228, a message monitor 230 for monitoring message traffic to and from the messaging server 200, and a messages repository 230 for storing messages sent and received by clients. The user records 228 include status information and address books of users. In some embodiments, a messaging application may include a calendar application, and interactions between a user and other contacts may include appointments or other calendar events that reference the user's contacts.

The contact status manager 234 includes a contact status monitor 236, a contact status collector 238, and a contact status sender 240. The contact status monitor 236 receives and processes messages announcing status changes and updates status of users. The contact status collector 238 gathers status information for contacts in a user's address book from other messaging servers. The contact status sender 240 sends the status information of contacts in a user's address book to the client associated with the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 204 may store a subset of the modules and data structures identified above. Furthermore, memory 204 may store additional modules and data structures not described above.

Although FIG. 2 shows a "messaging server," FIG. 2 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 2 could be implemented on single servers and single items could be implemented by one or more servers. The actual number of servers used to implement a messaging server and how features are allocated among them will vary from one implementation to another, and may depend in part on the amount of data traffic that the system must handle during peak usage periods as well as during average usage periods.

Figure 3:
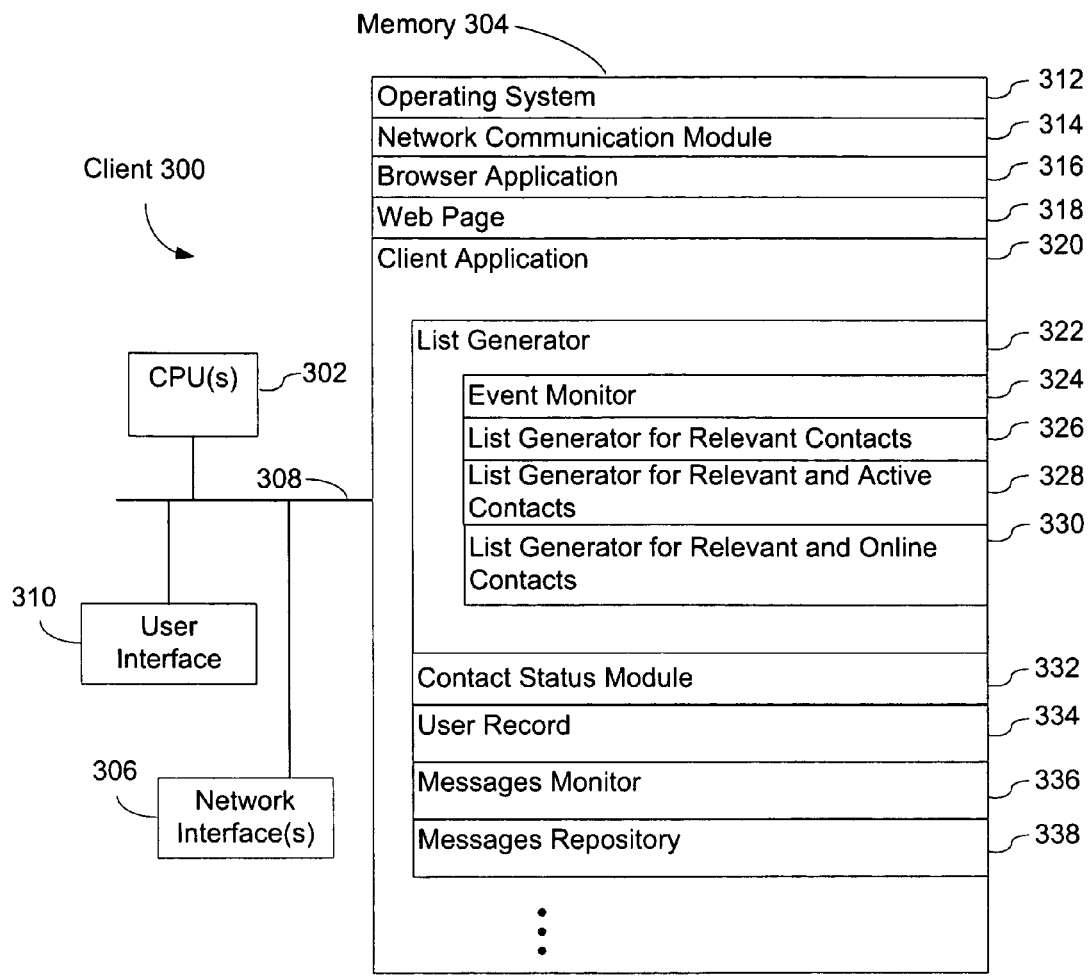
FIG. 3 is a block diagram illustrating a client, according to some embodiments of the invention.

FIG. 3 is a block diagram illustrating a client, according to some embodiments of the invention. The client 300 typically includes one or more processing units (CPU's) 302, one or more network or other communications interfaces 306, memory 304, and one or more communication buses 308 for interconnecting these components. The client 300 also includes a user interface 310, which may include a display device, a keyboard, and/or a mouse. Memory 304 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 304 may optionally include one or more storage devices remotely located from the CPU (s) 302. Memory 304, or alternatively one or more storage devices (e.g., one or more nonvolatile storage devices) within memory 304, includes a computer readable storage medium. In some embodiments, the computer readable storage medium stores the following programs, modules and data structures, or a subset thereof:

- an operating system 312 that includes procedures for handling various basic system services and for performing hardware dependent tasks;
- a network communication module 314 that is used for connecting the client 300 to other computers via the one or more communication network interfaces 306 (wired or wireless) to one or more communication networks, such as the Internet, other wide area networks, local area networks, metropolitan area networks, and so on;
- a browser application 316;
- a web page 318; and
- a client application 320.

The client application 320 includes a list generator 322 for generating lists of contacts; a contact status module 332 for sending, receiving, and processing status information; a user record 334, a messages monitor 336, and optionally a messages repository 338. The user record 334 is a copy of part or all of the messaging server's user record 228 for the particular user of the client 300. The messages monitor 336 monitors the sending and receiving of messages by the client application 320. The messages repository 338 is a store of messages sent or received by the client application 320. In some embodiments, the messages repository 338 only stores a small number of messages, such as one or more messages currently being viewed or drafted by the user, while other messages are stored at a message server.

The list generator 322 may include an event monitor 324, which detects events that are defined to triggers a list refresh. The list generator 322 also may include a list generator for relevant contacts 326, a list generator for relevant and active contacts 328, and a list generator for relevant and online contacts 330. The list generator for relevant contacts 326 generates a list of contacts that are relevant (e.g., contacts deemed most relevant in accordance with a scoring function), but not necessarily active or even online at all. The list generator for relevant and active contacts 328 generates a list of contacts that are relevant and "active" (or relevant and "chatty"). The list generator for relevant and online contacts 330 generates a list of contacts that are relevant and not offline.

In some embodiments, the client application 320 is a standalone application. In some other embodiments, the client application 320 may be an application embedded in a web page that is rendered by another application, such as a browser application 316. The application that is rendered by the browser application 316 may be displayed in a web page 318. In these embodiments, the client application may be written in JavaScript™ (a trademark of Sun Microsystems, Inc.), ECMAScript (the specification for which is published by the European Computer Manufacturers Association International), VBScript™ (a trademark of Microsoft, Inc.) and/or any other client-side scripting language. In other words, the client application 320 includes programs or procedures containing JavaScript instructions, ECMAScript instructions, VBScript instructions, or instructions in another programming language suitable for rendering by the browser application.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 304 may store a subset of the modules and data structures identified above. Furthermore, memory 304 may store additional modules and data structures not described above.

Although FIG. 3 shows a "client," FIG. 3 is intended more as functional description of the various features which may be present in a client than as a structural schematic of the embodiments described herein. In practice, and as recognized by those of ordinary skill in the art, items shown separately could be combined and some items could be separated.

Figure 4A:
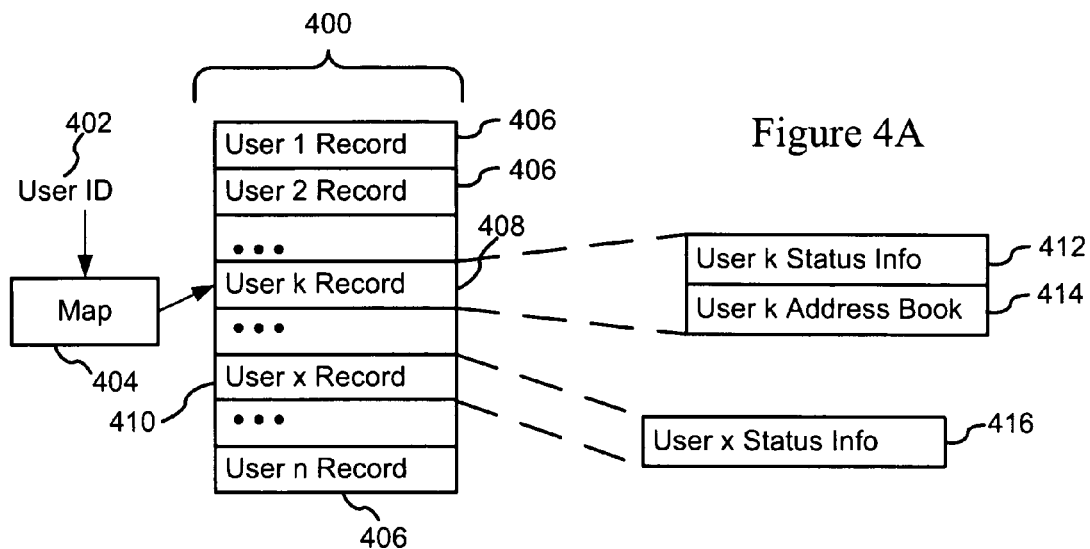

FIGS. 4A-4D illustrate data structures residing in a messaging server, according to some embodiments of the invention. The messaging server stores one or more user records in a data structure 400, as shown in FIG. 4A. Each user is associated with a unique user ID 402. In some embodiments, the user ID is a number. In some other embodiments, the user ID is a string of characters. The string of characters may represent, for example, a username, a username and a host/domain name, or an email address.

Each user ID is associated with a user record 406 by a map or index 404. The messaging server includes user records for users assigned to the messaging server, such as user record 408. The messaging server may also include user records, such as user record 410, for users not assigned to the messaging server but which are in the address books of users that are assigned to the messaging server. For the user record 408 of a user that is assigned to the messaging server, the messaging server stores that user's status information 412 and address book 414. For the user record 410 of a user who is not assigned to the messaging server, the messaging server stores that user's status information 416. That user's address book is stored at the messaging server to which that user is assigned.

Figure 4B:
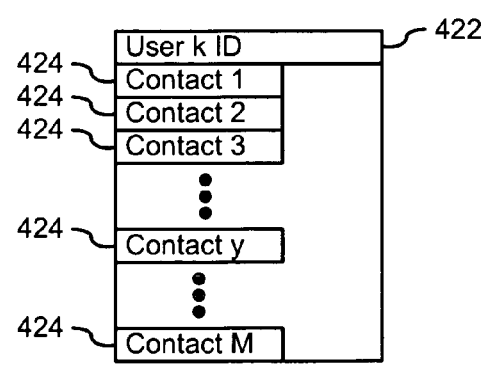

An exemplary address book 414 is illustrated in FIG. 4B. The address book includes a plurality of contact records 424. The address book may also include the user ID 422 of the user, to identify the user with which the address book is associated.

An exemplary contact record 424 is illustrated in FIG. 4C. The contact record 424 includes the user ID 432 of the contact, a name of the contact 434, a score 436 sometimes called the long term score, an optional short term score 438, an email address 440, and a phone number 442. The contact record may also have home contact information 444 and work contact information 450. The home contact information may include a home email address 446 and a home phone number

448. Similarly, the group for work contact information may include a work email address 452 and a work phone number 454. It should be appreciated, however, that additional or alternative information regarding the contact the contact may be included in the contact record.

The long term score 436 is used in the generation of contact lists for presentation. The long term score 436 may be determined based on many factors. The factors may include, but is not limited to, an interaction history (e.g., one or more of the following: message (email and/or IM) exchanges, file transfers or sharing, calendar events) between the user and the contact. In some embodiments, the factors may further include degrees of separation between contacts and/or profile matching. The long term score measures the degree of relevance of a contact to the user over a prolonged period of time, with a higher score indicating higher relevance. In some embodiments, the long term score is decayed by a predefined percentage (e.g., 10%) at predefined intervals, such as monthly or weekly.

In some embodiments, only one contact interaction score 436 is used for generating contact lists for presentation to the user. However, in some other embodiments, both the long term score 436 and the short term score 438 are used in the generation of contact lists for presentation. The short term score 438 is a score based on short-term message activity from the user to the contact. The short term score is, in some embodiments, a running tally of messages sent by the user to the contact. Thus, a message sent by the user to the contact results in an increment of 1 of the short term score. Some special messages may result in an increment of more than 1 to the short term score. In some embodiments, the running tally counts only IM messages and special messages. The short term score measures the degree of relevance of a contact to the user over a short period of time up to the present moment. In some embodiments, the short term score is decayed by a predefined percentage (e.g., 10%) each day. In other embodiments, the short term score 438 may be based a broader spectrum of interactions between the user and contact, including messages received and sent, and calendar events. In some embodiments, the short term score may be based on messages to the contact; or interactions between the user and contact, in a predefined time window, such as a week; or a predefined number (e.g., a number between 2 and 15) of days; or may be based on the time of the last interaction with the contact rather than an accumulated score over time.

FIG. 4D illustrates a data structure for a user's status information 412, 416. The data structure includes the user's ID 462 and one or more status data 463. Each status data 463 includes location information 464, the user status at that location 466, and a status message 468. The status data 463 provides information on the status of the user at a particular device or location, represented by the location information 464. The status 466 indicates the user's status at the corresponding location, such as offline, active, idle, the time user was last online and so forth. The status 466 may be any of the predefined statuses or custom statuses defined by the user. The status message 468 is a string of characters that may be predefined or defined by the user to elaborate further on the user's status. The status message 468 is optional, and thus may be an empty string if it is not predefined or defined by the user.

Figure 5A:
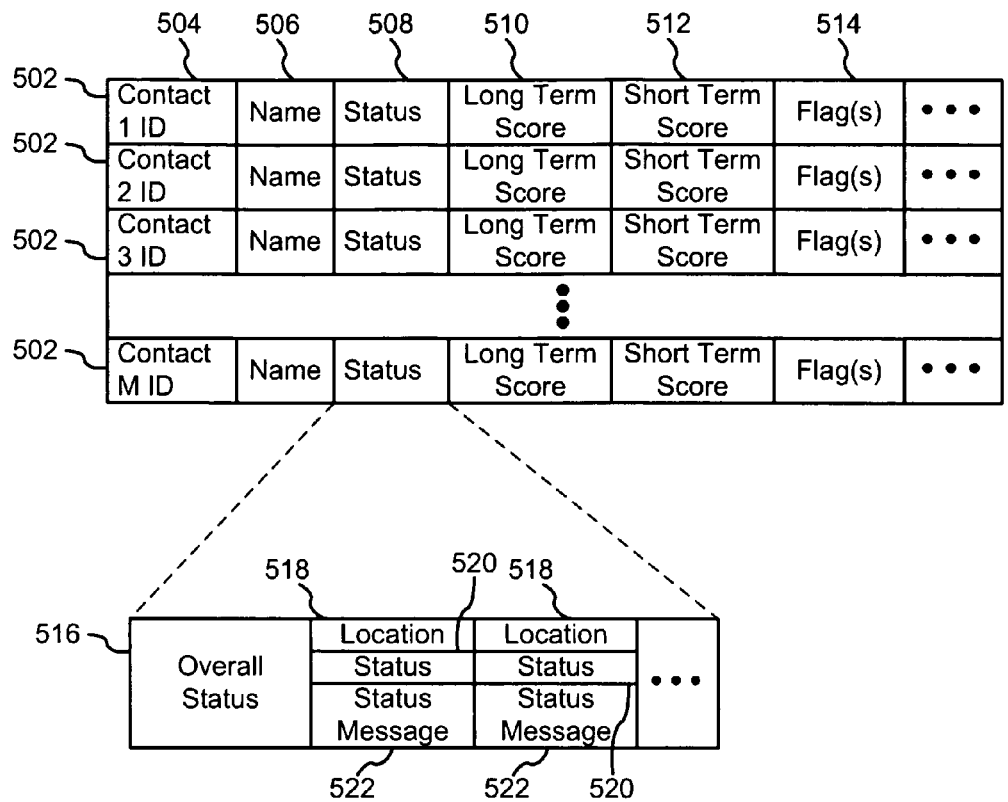
FIGS. 5A-5B illustrate data structures residing in a client, according to some embodiments of the invention.
Figure 5B:
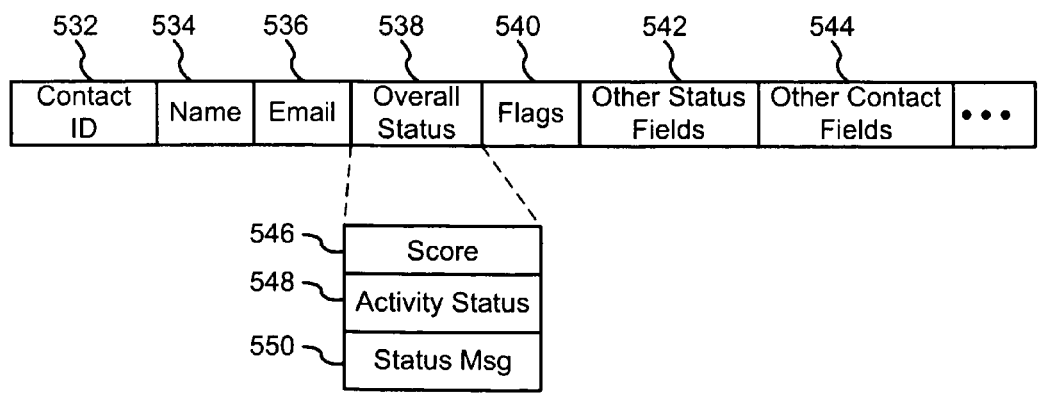

FIGS. 5A-5B illustrate data structures residing in a client, according to some embodiments of the invention. The client may store one or more contact records 502. The contact records that are stored at the client correspond to the contacts in the address book (at the messaging server) of the user of the client. In other words, whatever contacts are in the user's address book at the messaging server, data for those contacts may also be stored at the client as well. In some embodiments, the client replicates the contact information (e.g., contact records) stored for the user at a messaging server. In some other embodiments, the client replicates a subset of the contact information stored for the user at a messaging server.

In FIG. 5A, a contact record 502 includes the user ID of the contact 504, a name of the contact 506, status information 508, a long term score 510, a short term score 512, and one or more flags 514. The user ID 504, name 506, status information 508, long term score 510, and short term score 512 are replicated from the messaging servers. The contact record data in the messaging servers is the authoritative version and may be used to overwrite any conflicting data at the client. In some embodiments, the client may track some data, such as the short term score 512, quasi-independently. That is, the messaging server and the client may calculate the short term score independently, but the client still replicates the score from the server at predefined intervals or upon particular events, such as the user coming online or when the score is decayed.

The one or more flags 514 indicate one or more states associated with the contact. In some embodiments, the flags 514 may include one or more of the following: a flag indicating whether an outgoing request for the contact's status information is pending, a flag indicating whether an incoming request from the contact for the user's status information is pending, a flag indicating whether the contact is designated as special or important by the user, a flag indicating whether the user has previously refused (or blocked) the contact from receiving status information associated with the user, a flag indicating whether the user has blocked this contact from any real-time communications with the user, and a flag indicating whether the user has removed this contact from his quick list (further details regarding quick lists are described below, in relation to FIGS. 6-10).

The status information 508 is status information for the corresponding contact. The status information 508 includes one or more locations 518 and corresponding statuses 520 and status messages 522. These locations and corresponding statuses and status messages are replicated from the location information 464, statuses 466, and status messages 468 that are stored at the message server(s). From these, an overall status 516 is determined and stored in the data structure. In some embodiments, the overall status 516 is the most recent status 520 of the user at any location and the status message 522 from the same location. In other embodiments, each location may give itself a priority number, and the overall status is chosen from the location with the highest priority. When the user has only one location, the overall status 516 is simply a copy of the user status at that one location.

FIG. 5B illustrates an alternative embodiment of a contact record 502 stored at the client. The contact record includes the user ID of the contact 532, a name of the contact 534, an email address 536 of the contact, an overall status 538, one or more flags 540, other status fields 542, and other contact fields 544. The user ID, name, email address and overall status are automatically replicated from the message servers for all contacts in the user's address book. Other fields, such as the other status fields 542 and other contact fields, are replicated at the client for specific contacts when those fields are needed (e.g., the other contact fields 544 are needed when the user requests to open a contact record in the user's address book).

The overall status 538 includes a score 546, an activity status 548, and a status message 550. The score, used in the generation of contact lists for presentation, may be either the long term score 436 associated with the contact, the short term score 438 associated with the contact, or a mathematical combination (e.g., a weighted sum) of both. The activity status 548 and status message 550 are derived from the status information illustrated in FIG. 4D.

Figure 6:
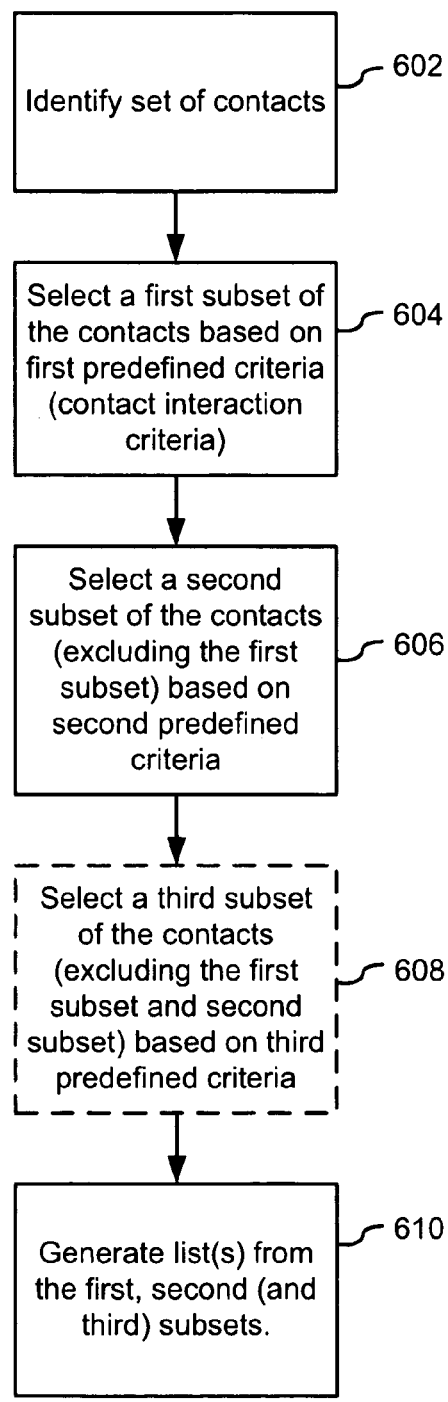
FIG. 6 is a flow diagram illustrating a process for generating one or more lists of contacts from a set of contacts, according to some embodiments of the invention.

FIG. 6 is a flow diagram illustrating a process for generating one or more lists of contacts from a set of contacts, according to some embodiments of the invention. The process may be performed at a messaging server or at a client. A set of contacts is identified (602). In some embodiments, the identified set of contacts includes all contacts in the user's address book. In some other embodiments, the identified set of contacts may be a subset of the contacts in the user's address book. The size of the subset may be determined based on a display region of the client application. For example, if the display region can display at most p contacts, then the size of the subset is the smaller of (A) the number of contacts in the user's entire address book, and (B) a multiple of p, such as 12p. Thus, to provide a numeric example, if the display region can display at most twenty contacts, and the user's address book has 300 contacts, then operation 602 would select 240 of the 300 contacts. Furthermore, the selection of 240 contacts may be based on a score associated with the each of the contacts in the user's address book.

In yet another example, if the user enters a contact selection string, then the identified set of contacts is the set of contacts consistent with the user-entered contact selection string. However, if that set is bigger than a defined maximum number (e.g., 12p) of identified contacts, then the identified set of contacts would be the defined maximum number of contacts that are consistent with the user-entered contact selection string and have the highest scores. In some embodiments, the user-entered contact selection string is consistent with a contact if any field of the associated contact record has a word or term that matches, begins with or includes the user-entered contact selection string. For instance, if the user-entered contact selection string is "google.com," then all contacts in the user's address book having an email address whose email domain is or includes "google.com" will be included in the identified set of contacts, unless that set exceeds a defined maximum number, as described above. In some other embodiments, the user-entered contact selection string is consistent with a contact if any of a predefined set of fields (e.g., name, email name, email domain, IM name) of the associated contact record has a word or term that matches or begins with the user-entered contact selection string.

A first subset of the identified set of contacts is selected based on first predefined criteria (604). A second subset of the contacts is selected from the identified set of contacts, minus the first subset, based on second predefined criteria (606). Optionally, a third subset is selected based on third predefined criteria (608). The third subset is selected from the set of contacts minus the first and second subsets. In some embodiments, further subsets may be selected from the set of identified contacts, excluding the previously selected subsets, based on further criteria. One or more lists of contacts are generated from the first and second subsets (and the third subset, if that was generated) (610). The list(s), which are also known as quick list(s), may be displayed in a display region of a client application.

In some embodiments, a quick list is generated (610) from the previously selected subsets by repeatedly selecting one contact (or more than one contact) from each of the subsets, in round robin order, until the quick list occupies the available display region. When selecting contacts from each set to include in a quick list, the contacts are selected in accordance with those having the highest scores or best match to the selection criteria associated with those subsets. If the first subset is to be allocated N contacts for each contact allocated to each of the other subsets, then N contacts are selected from the first subset during each selection round, while one contact is selected from each of the other subsets. When adding a next contact to the quick list would cause the quick list to exceed the available display region, the selection of contacts for inclusion in the quick list is complete.

In addition, in some embodiments, when adding a next contact to the quick list would add a duplicate contact (also called a repeated contact) to the quick list, the method instead selects from a current subset a next contact (if any) that is not a duplicate of any of the contacts already in the quick list. Alternately, duplicate contacts, if any, are removed from the subsets (if the method of generating the subsets is capable of producing duplicate contacts in the subsets) prior to the subset merging process.

In another embodiment, a quick list is generated (610) from the previously selected subsets by merging the subsets, optionally removing any duplicate contacts (if the method of generating the subsets is capable of producing duplicate contacts in the subsets), determining if the resulting quick list is too large for the available display region, and then removing from the quick list one or more lowest scoring or lowest priority contacts in the respective subsets of contacts (for instance by selecting the contacts to remove in a round robin order with respect to the subsets of contacts), until the quick list is no longer too large for the available display region.

The first predefined criteria include contact interaction criteria. Contact interaction criteria are based on a user's interactions with a contact in the set of contacts. The interaction may include but is not limited to: sending and receiving of messages such as instant messages and/or emails (i.e., the message history between the user and the contact); scheduled meetings between the user and the contact, as indicated by entries in a calendar; transfers or sharing of files (such as digital images, digital audio, digital video, and other documents); and patterns of communication between the user and the contact based on the time of day, day of the week, and the like. In some embodiments, one or more scores, such as the long term score and short term score described above, are determined based on the interaction and the contacts with the highest scores are selected.

The second predefined criteria may include the first predefined criteria and additional criteria. In some embodiments, the second predefined criteria include the contact interaction criteria and user activity criteria. The user activity criteria are whether the contact is active, idle, busy, and so forth. The user activity level of each contact in a user's address book can be mapped to a numeric value, or alternately the user activity levels may be ordered from highest to lowest activity levels without assigning or associating numeric values with the user activity levels.

The third predefined criteria may include the first predefined criteria and additional criteria. In some embodiments, the third predefined criteria include whether a contact has displayed a custom, user-defined status as well as the contact interaction criteria and connectedness criteria. The connectedness criteria are whether the contact is online or offline.

In some embodiments, fourth predefined criteria for selecting further subsets include the long term score as the primary criterion, with the short term score as a tiebreaker. This criterion ensures that a group of selected "long-term" relevant contacts remain relatively stable, notwithstanding short-term messaging activity.

In some other embodiments, a first subset of the identified set of contacts is selected based on first predefined criteria (604). A second subset of the contacts is selected from the identified set of contacts, based on second predefined criteria (606); the second subset may overlap with the first set. Optionally, a third or further subsets are selected from the set of identified contacts based on further predefined criteria (608), and again these subsets may all overlap with the previously selected subsets. Then the subsets may be combined and any duplicate contacts are removed (610). As noted above, the subsets may be merged using a round robin selection method so as to select the highest scoring contacts from each subset for inclusion into a merged quick list. The merged quick list may be displayed in a display region of a client application.

By selecting a first subset based on contact interaction and a second subset (and optionally a third and fourth subset) based on additional criteria and then generating the quick list(s) of contacts from those subsets, the list is ensured to include at least some contacts in which the user is very much interested based on various kinds of interaction with the contact and at least some contacts that are online and in which the user is interested. Displaying these quick lists in a display region of the client application makes these selected contacts easily accessible to the user and may reduce the likelihood that the user needs to search through his or her roster of contacts to find the one with whom he or she wishes to communicate.

Figure 7:
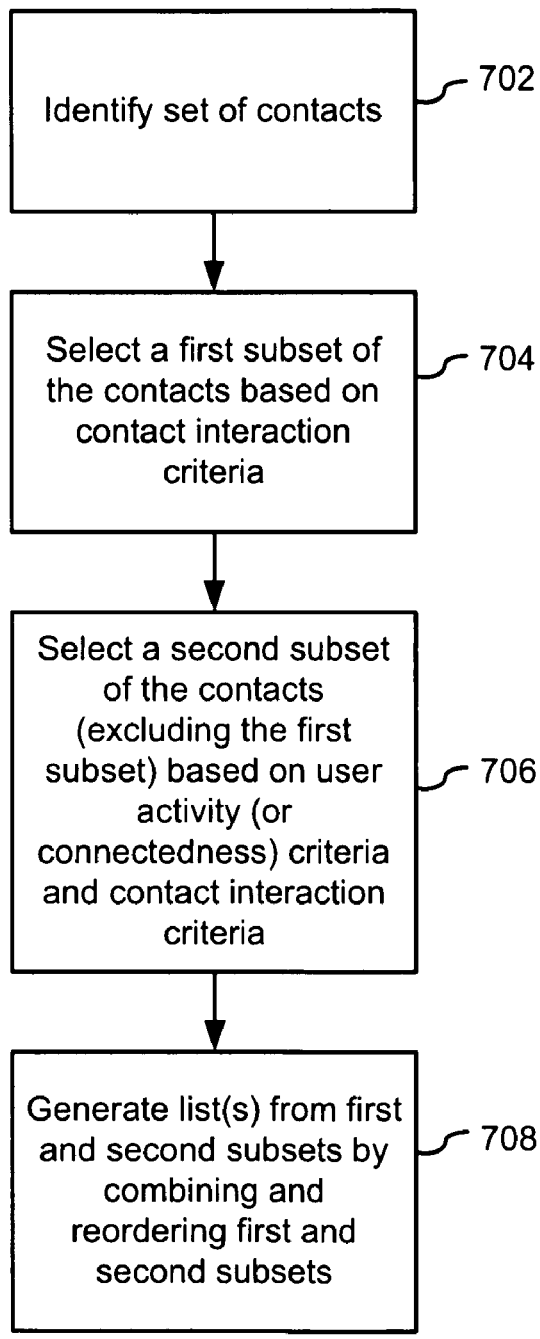
FIG. 7 is a flow diagram illustrating a process for generating one or more lists of contacts for presentation in a display region, according to some embodiments of the invention.

FIG. 7 is a flow diagram illustrating a process for generating one or more lists of contacts for presentation in a display region, according to some embodiments of the invention. A set of contacts is identified (702). In some embodiments, the set of contacts are the contacts in the user's address book. In some other embodiments, the set may be a subset of the contacts in the user's address book, as described above.

A first subset of the contacts is selected based on contact interaction criteria (704). A second subset of the contacts is selected from the set of contacts, minus the first subset, based on user activity or connectedness criteria and contact interaction criteria (706). One or more quick lists of contacts are generated by combining and reordering the first and second subsets (708). In some embodiments, the contacts in the combined quick list are ordered by status. For example, the active and chatty contacts may be on the top, followed by the busy contacts, then idle contacts, and finally offline contacts. Within each status grouping, the contacts may be ordered based on other predefined criteria, such as whether the contact has a status message and/or whether the user has had high interaction history with the contact. The quick list(s) may be displayed in a display region of a client application, along with status indicators for each contact and possibly status messages.

Figure 8:
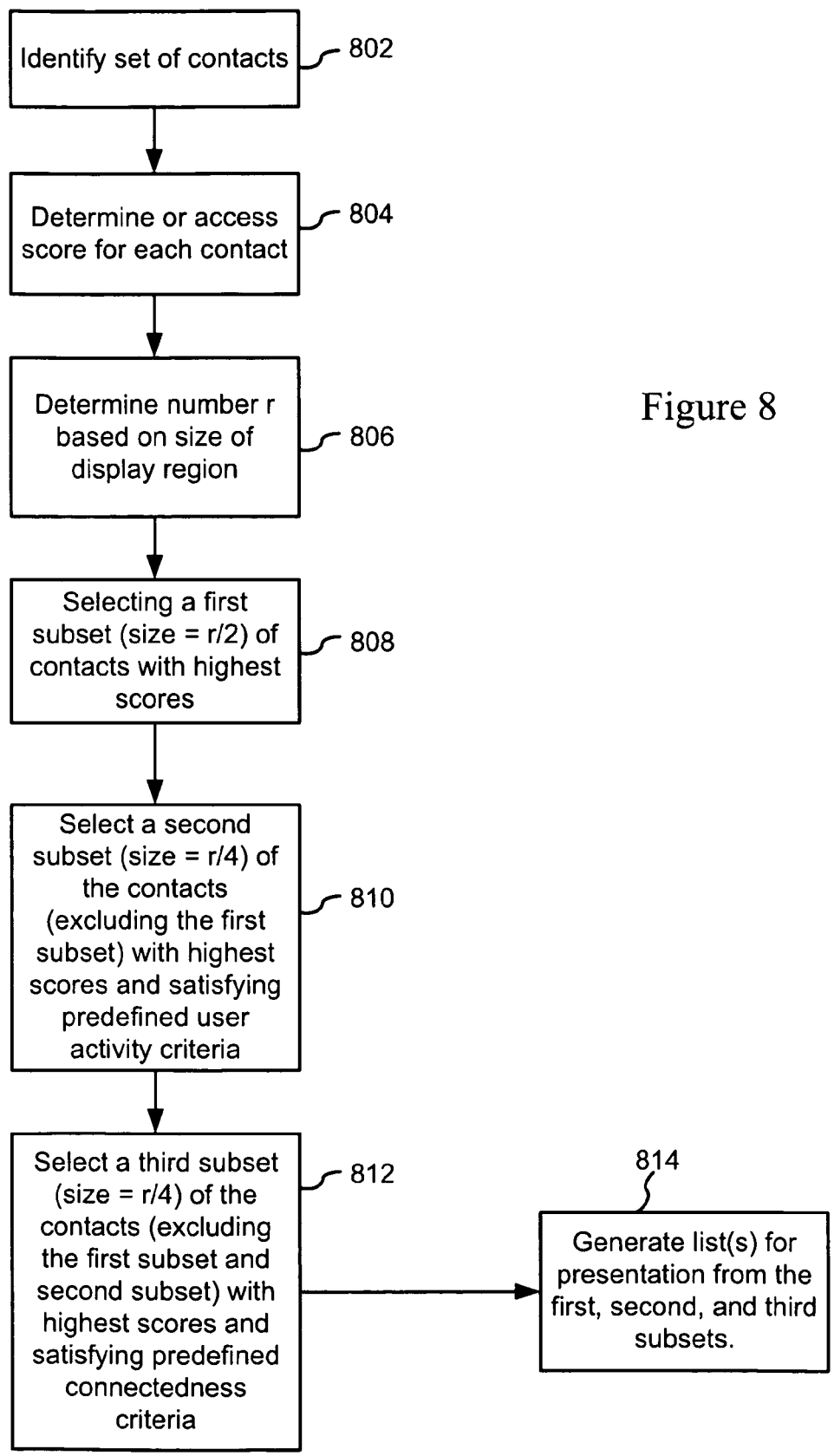
FIG. 8 is a flow diagram illustrating a process for generating one or more lists of contacts based on scores, according to some embodiments of the invention.

FIG. 8 is a flow diagram illustrating a process for generating one or more lists of contacts based on scores, according to some embodiments of the invention. A set of contacts is identified (802). The set of contacts may be the contacts in the user's address book or a subset thereof, as described above. A score is determined or accessed for each contact in the set (804). A score may already have been determined for a contact. In that case, that score may be accessed. Sometimes, a score may not be available for a contact or the score that is available is outdated. In such cases a new score may be determined for the contact.

In some embodiments, the score is the long term score or the short term score, as described above in relation to FIGS. 4A-4D. In some other embodiments, the score is a mathematical combination, such as a weighted sum, of the long term score and the short term score. The long term score is based on the complete interaction history between the user and the contact, while the short term score is based on message activity in a predefined time frame, up to the present time. In some other embodiments, the long term score is based on email and/or IM activity between the user and the contact. For example, the long term score may be a weighted sum of the numbers of email messages and instant messages. An exemplary formula for a long term score based on emails and IMs is:

$$S=(0.75*\text{emails})+(0.25*\text{IMs})$$

An integer number (designated as "r" in FIG. 8) is determined based on the size of a display region (806). In some embodiments, the number r is how many contacts may be displayed in the display region of a client application, based on an assumption that each contact takes up a predefined number of vertical pixels in the display region. In some other embodiments, the number r may merely be an estimate of how many contacts may be displayed in the display region. This is so because while the estimate may be based on a predefined number of pixels per contact, a contact may take up more or pixels than the assumed rate when actually displayed if additional information, such as a status message, is displayed along with the contact.

In some embodiments, operations 802-806 may be reordered. Operation 804 may be performed first for all contacts in the user's address book. Afterwards, operation 806 may be performed before operation 802. By reordering the operations, the identified set of contacts may be reduced in size from the size of the user's address book by eliminating the most "irrelevant" (i.e., having lowest scores), outlier contacts. The size of the subset may be defined to be a multiple of r (e.g., 12r.)

A first subset of contacts is selected from the set of identified contacts (808). The contacts in the first subset have the highest scores amongst all of the contacts in the identified set. A second subset of contacts is selected from the identified set of contacts, minus the first subset, based on high scores and predefined user activity criteria (810). The second subset includes contacts having highest scores amongst the contacts in the set of contacts, not including the first subset, whose statuses match any of a predefined set of statuses. In some embodiments, the predefined set of statuses includes "active" and "chatty."

In an alternate embodiment, the overall status of each contact in a user's address book is mapped to a numeric value. The mapping process may include boosting the activity level value of contacts with personalized status messages. In this embodiment, the second subset of contacts are selected by selecting the contacts having the best activity level values, indicating the highest levels of activity, and within the set of contacts sharing a particular activity level value, the contacts with the highest contact interaction scores are selected. It is noted that the "best" activity level values may be the highest or lowest values, depending on how the contact activity levels are mapped to activity level values. Thus, if five contacts are to be selected for the second subset, and there are two contacts with the best activity level value and ten contacts with the second best activity level value, the second subset will include (A) the two contacts with the best activity level, and (B) three contacts, selected from among the contacts with the second best activity level values, having the highest contact interaction scores.

A third subset of the contacts is selected from the set of contacts, excluding the first and second subsets, based on highest scores and predefined connectedness criteria (812). The third subset includes the contacts having highest scores amongst the contacts in the set of contacts, not including the first and second subsets, that are online.

In some embodiments, the sizes of the subsets are based on the number r. In some embodiments, the size of the first subset is r/2, the size of the second subset is r/4, and the size of the third subset is r/4, all rounded (up or down) to an integer. The subset sizes do not have to be exactly r/2 or r/4, since there may be rounding. However, the sizes of the threes subsets sum up to r.

One or more quick lists of contacts are generated from the first, second, and third subsets for presentation in the display region (814). In some embodiments, a quick list is generated by combining the first, second and third subsets and ordering them based on status and then by score.

It should be appreciated that while some of the steps described above call for selecting contacts with highest scores, it is not necessary to sort the contacts by score first and then select the high-scoring contacts. There are algorithms well known in the art that can select the highest n values in a set without sorting. An example of such an algorithm is the "nth element" function in the Standard C++ Library. The nth element function partitions a set of values into three sets, the n-th value in the range of values, all values less than or equal to the nth value, and all values equal to or greater than the nth value. By using such an algorithm to select contacts, and avoiding sorting until the list generation step, the running time of the process may be reduced.

In some embodiments, the process of FIG. 8 may be performed entirely at the messaging server(s). That is, the all of the operations, including the score determination and list generation, are performed at the messaging servers and the generated quick lists are sent to the client application for display in a display region of the client application. In some other embodiments, some steps may be performed at the messaging server(s) while others are performed at the client. For example, score determination may be performed at the messaging servers. After the scores are sent to the client application, the client application generates the quick lists of contacts based on the scores. In further other embodiments, the messaging server merely sends to the client the "raw data," such as contact interaction data and status information, and the client performs the operations shown. Whether the operations are performed at the server, at both the server and client, or at the client may be based on a variety of factors, such as whether the client application is a standalone application or an application that is rendered by another application (e.g., a browser) and the availability of network and/or computing resources.

Figure 9:
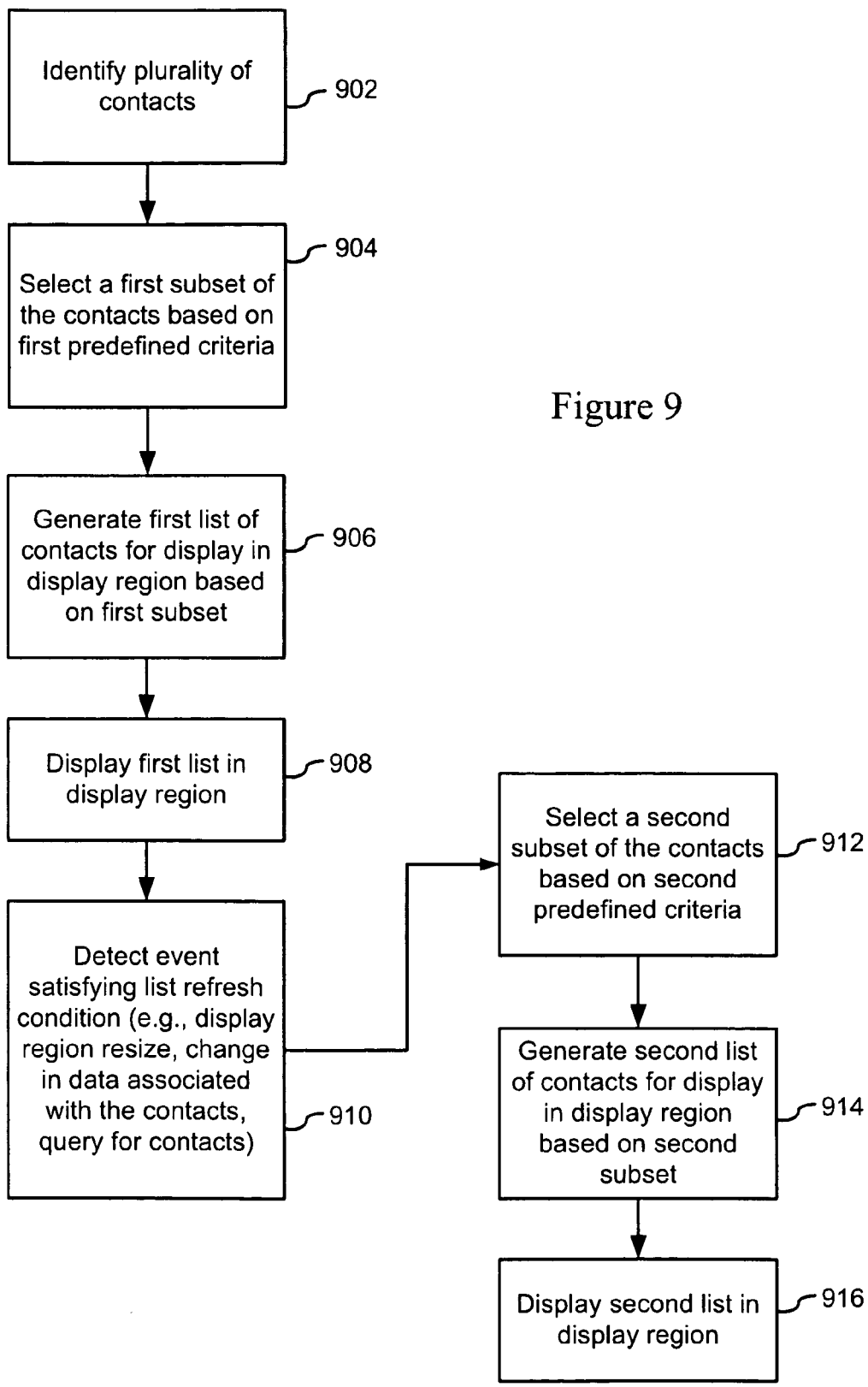
FIG. 9 is a flow diagram illustrating a process for refreshing one or more lists of contacts in response to an event, according to some embodiments of the invention.

FIG. 9 is a flow diagram illustrating a process for refreshing one or more lists of contacts in response to an event, according to some embodiments of the invention. One or more quick lists of contacts may be displayed in a display region of a client application, such as an instant messaging application. Upon certain events, such as a resize of the display region, the quick list(s) may be refreshed to display more or less, and possibly different, contacts.

A plurality of contacts is identified (902). The plurality of contacts may be the contacts in the user's address book or a subset thereof, as described above. A first subset of the contacts is selected based on first predefined criteria (904). The first predefined criteria may include one or more of the following: interaction between the user and the contact (the relevance of the contact to the user), the status of the contact, and the connectedness of the contact. The size of the first subset may be a function of the size of the display region. A first list of contacts is generated based on the first subset, for display in a display region of a client application (906). The size of the first quick list is based on the size of the display region. The first list is displayed in the display region (908). If the list is generated at a messaging server, the list is sent to the client application for display.

An event satisfying a list refresh condition is detected (910). In some embodiments, events that satisfy the list refresh condition include a resize of the display region (which may be caused by the user resizing the client application window in which the display region is located), a user query for contacts that satisfy the query, and an update to the data associated with the contacts, such as an update to the status and/or scores of one or more contacts.

Upon the event satisfying the list refresh condition a second set of contacts is selected from the plurality of contacts based on second predefined criteria (912). The second predefined criteria may include one or more of the following: interaction between the user and the contact (the relevance of the contact to the user), the status of the contact, and the connectedness of the contact. The size of the second subset may also be a function of the display region. If the display region had been resized, then the size of the second subset may be based on the new size. A second quick list of contacts is generated based on the second subset, for display in a display region (914). The size of the second quick list is based on the size of the display region. If the display region had been resized, then the size of the second quick list is based on the new size. The second list is displayed in the display region (916).

Figure 10A:
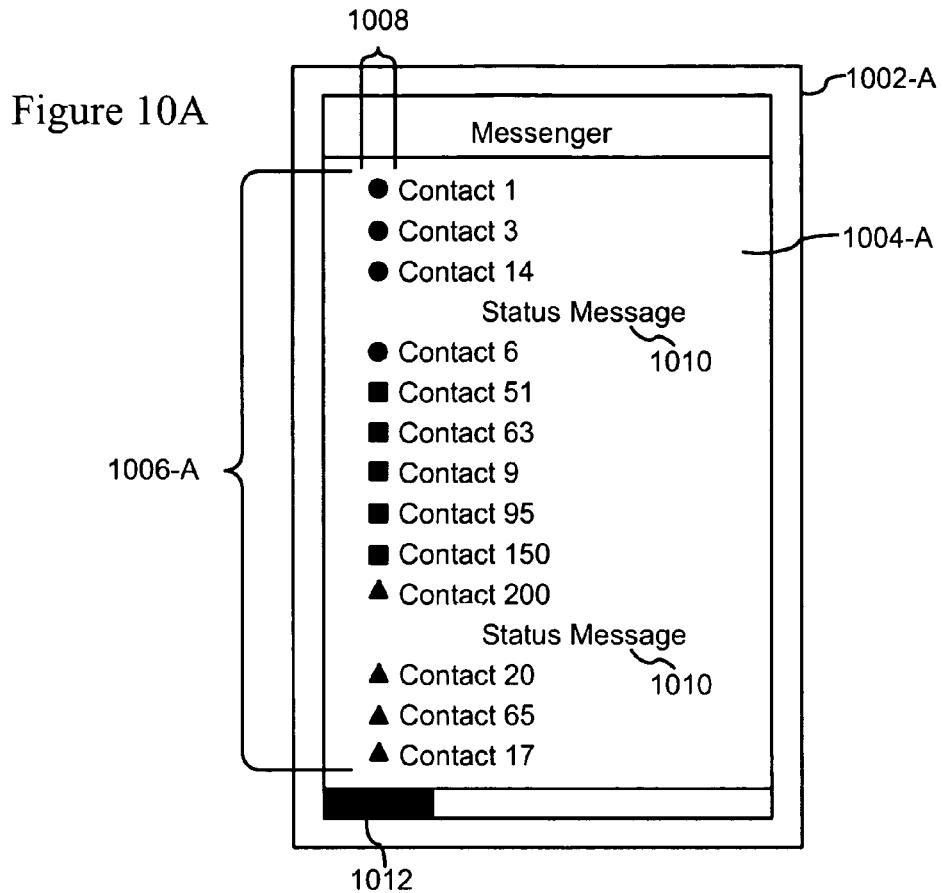
FIGS. 10A-10B illustrate the display region of a client application, according to some embodiments of the invention.
Figure 10B:
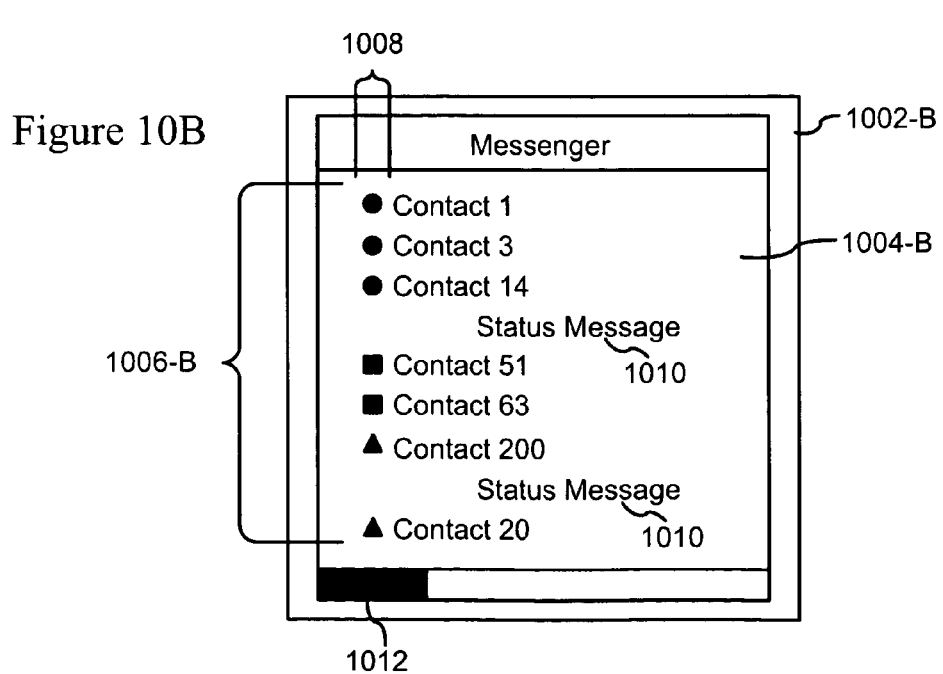

FIGS. 10A-10B illustrate the display region of a client application, according to some embodiments of the invention. In FIG. 10A, a client application window 1002-A includes a display region 1004-A. The client application window 1002-A includes no vertical scrollbar, but does include a horizontal scrollbar 1012. In some embodiments, the client application window 1002-A may have no vertical and no horizontal scrollbar. Within the display region 1004-A are displayed a quick list of contacts 1006-A. The contacts in the list are selected from the user's address book based on predefined criteria, such as relevance, status, and connectedness. Within the display region is a column of icons 1008. The column 1008 includes icons adjacent to each contact displayed in the display region, indicating the current status of the respective contact. For some contacts, a status message 1010 may be displayed in the display region as well.

FIG. 10B illustrates the same client application window after it has been resized. The client application window 1002-A of FIG. 10A has been resized to client application window 1002-B. The window 1002-B is smaller height-wise than window 1002-A. Because of the shorter height, the display region 1004-A of FIG. 10A also was resized to display region 1004-B. The window 1002-B may also include the horizontal scrollbar 1012. The quick list of contacts 1006-B displayed in the display region 1004-B has less contacts than before (1006-A) due to the smaller display region 1004-B. The quick list was refreshed upon the resizing of the display region 1004-B to show less contacts, such that the quick list can fit into the new display region 1004-B without including a vertical scroll bar. Status icons 1008 and status messages 1010 may be displayed in the display region 1004-B for contacts that are displayed in the quick list 1006-B.

An advantage of selecting contacts for display in a quick list based on "relevance" and status is that it reduces the need for vertical scrolling to look for contacts that are out of view. Many users' address books are larger than the display region of the client application, even at the largest display region sizes. Given that, users often are forced to scroll through the display region to find the contacts with which they wish to communicate. By selecting and displaying the most relevant contacts and/or the most relevant contacts that are active and/or the most relevant contacts that are online, the probability that the contact with which the user wishes to communicate is already displayed and in view is increased, thus reducing the need for scrolling. This enhances the messaging experience for the user.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of selecting contacts in an electronic messaging system for presentation in a display region, comprising:
   on a computer system having one or more processors and memory storing programs executed by the one or more processors, generating an integrated list of contacts by:
   identifying a set of contacts of a user;
   selecting a first subset of one or more contacts from the set of contacts in accordance with first predefined criteria, the first predefined criteria comprising contact interaction criteria based on quantity of prior electronic messaging communications between the user and contacts in the set of contacts;
   selecting a second subset of one or more contacts from the set of contacts excluding the first subset based on second predefined criteria, the second predefined criteria comprising online status criteria and the contact interaction criteria; and
   generating for presentation in a display region the integrated list of contacts from the first and second subsets of contacts, including combining and reordering the first and second subsets of contacts;
   wherein the integrated list of contacts includes, for respective contacts in the integrated list, indicia of current status of the respective contacts, and the contacts in the integrated list of contacts are ordered in accordance with predefined criteria.

2. A computer-implemented method of selecting contacts in an electronic messaging system for presentation in a display region, comprising:
   on a computer system having one or more processors and memory storing programs executed by the one or more processors, generating an integrated list of contacts by:
   identifying a set of contacts of a user;
   selecting a first subset of one or more contacts from the set of contacts in accordance with first predefined criteria, the first predefined criteria comprising contact interaction criteria based on quantity of prior electronic messaging communications between the user and contacts in the set of contacts;
   selecting a second subset of one or more contacts from the set of contacts based on second different predefined criteria comprising online status criteria; and
   generating for presentation in a display region the integrated list of contacts from the first and second subsets of contacts, wherein the integrated list is generated so as to include at least one contact that is not included in the first subset and at least one contact that is not included in the second subset;
   wherein the integrated list of contacts includes, for respective contacts in the integrated list, indicia of current status of the respective contacts, and the contacts in the integrated list of contacts are ordered in accordance with predefined criteria.

3. The method of claim 2, wherein the first predefined criteria comprises both the contact interaction criteria and a requirement that each selected contact in the first subset satisfy a query string in a received query.

4. The method of claim 2, wherein the second predefined criteria comprises predefined user activity criteria.

5. The method of claim 2, wherein selecting the second subset of contacts includes selecting contacts so as to exclude contacts in the first subset of contacts.

6. The method of claim 2, further comprising:
   selecting a third subset of one or more contacts from the set of contacts excluding the first and second subsets based on third predefined criteria; and
   the method includes generating for presentation in the display region the integrated list of contacts from the first, second, and third subsets.

7. The method of claim 6, wherein the third predefined criteria comprises predefined connectedness criteria.

8. The method of claim 6, wherein generating the integrated list of contacts from the first, second, and third subsets comprises combining and reordering the first, second, and third subsets.

9. The method of claim 2, wherein identifying the set of contacts further comprises determining a score for each contact in the set of contacts.

10. The method of claim 9, wherein determining the score comprises determining the score for each contact in the set of contacts based on one or more interaction metrics with respect to the respective contact.

11. The method of claim 9, wherein selecting the first subset comprises selecting from the set of contacts a first number of contacts having highest respective scores, wherein the scores are based on one or more interaction metrics.

12. The method of claim 11, wherein the first number is based on a size of the display region.

13. The method of claim 11, wherein selecting the second subset comprises selecting from the set of contacts excluding the first subset, a second number of contacts having highest respective scores and satisfying predefined user activity criteria.

14. The method of claim 13, wherein the second number is based on a size of the display region.

15. The method of claim 2, further comprising presenting the lists of contacts in the display region without a vertical scroll bar.

16. A system for selecting contacts in an electronic messaging system for presentation in a display region, comprising:
   one or more processors; and
   memory storing one or more modules for execution by the one or more processors, the one or more modules including instructions to generate an integrated list of contacts, the instructions including instructions:
   to identify a set of contacts of a user;
   to select a first subset of one or more contacts from the set of contacts in accordance with first predefined criteria, the first predefined criteria comprising contact interaction criteria based on quantity of prior electronic messaging communications between the user and contacts in the set of contacts;

to select a second subset of one or more contacts from the set of contacts based on second different predefined criteria comprising online status criteria; and to generate for presentation in the display region the integrated list of contacts from the first and second subsets of contacts, wherein the integrated list is generated so as to include at least one contact that is not included in the first subset and at least one contact that is not included in the second subset;

wherein the integrated list of contacts includes, for respective contacts in the integrated list, indicia of current status of the respective contacts, and the contacts in the integrated list of contacts are ordered in accordance with predefined criteria.

17. A system for selecting contacts in an electronic messaging system for presentation in a display region, comprising:

one or more processors;

memory storing one or more modules for execution by the one or more processors;

means for generating an integrated list of contacts, including means for:

identifying a set of contacts of a user;

selecting a first subset of one or more contacts from the set of contacts in accordance with first predefined criteria, the first predefined criteria comprising contact interaction criteria based on quantity of prior electronic messaging communications between the user and contacts in the set of contacts;

selecting a second subset of one or more contacts from the set of contacts based on second different predefined criteria comprising online status criteria; and generating for presentation in the display region the integrated list of contacts from the first and second subsets of contacts, wherein the integrated list is generated so as to include at least one contact that is not included in the first subset and at least one contact that is not included in the second subset;

wherein the integrated list of contacts includes, for respective contacts in the integrated list, indicia of current status of the respective contacts, and the contacts in the integrated list of contacts are ordered in accordance with predefined criteria.

18. A non-transitory computer readable storage medium storing one or more programs for execution by one or more processors of a computer system, the one or more programs comprising instructions to generate an integrated list of contacts in an electronic messaging system, the instructions including instructions for:

identifying a set of contacts of a user;

selecting a first subset of one or more contacts from the set of contacts in accordance with first predefined criteria, the first predefined criteria comprising contact interaction criteria based on quantity of prior electronic messaging communications between the user and contacts in the set of contacts;

selecting a second subset of one or more contacts from the set of contacts based on second different predefined criteria comprising online status criteria; and generating for presentation in a display region the integrated list of contacts from the first and second subsets of contacts, wherein the integrated list is generated so as to include at least one contact that is not included in the first subset and at least one contact that is not included in the second subset;

wherein the integrated list of contacts includes, for respective contacts in the integrated list, indicia of current status of the respective contacts, and the contacts in the integrated list of contacts are ordered in accordance with predefined criteria.

19. The computer readable storage medium of claim 18, wherein the first predefined criteria comprises both the contact interaction criteria and a requirement that each selected contact in the first subset satisfy a query string in a received query.

20. The computer readable storage medium of claim 18, wherein the second predefined criteria comprise predefined user activity criteria.

21. The computer readable storage medium of claim 18, wherein the instructions for selecting the second subset of contacts comprise instructions for selecting contacts from a set of contacts that excludes the first subset of contacts.

22. The computer readable storage medium of claim 18, further comprising instructions for:

selecting a third subset of one or more contacts from the set of contacts excluding the first and second subsets based on third predefined criteria;

wherein the instructions for generating the integrated list of contacts include instructions for generating for presentation in the display region the integrated list of contacts from the first, second, and third subsets.

23. The computer readable storage medium of claim 22, wherein the third predefined criteria comprises predefined connectedness criteria.

24. The computer readable storage medium of claim 22, wherein the instructions for generating an integrated list of contacts from the first, second, and third subsets comprise instructions for combining and reordering the first, second, and third subsets.

25. The computer readable storage medium of claim 18, wherein the instructions for identifying the set of contacts further comprise instructions for determining a score for each contact in the set of contacts.

26. The computer readable storage medium of claim 25, wherein the instructions for determining the score comprise instructions for determining the score for each contact in the set of contacts based on one or more interaction metrics with respect to the respective contact.

27. The computer readable storage medium of claim 25, wherein the instructions for selecting the first subset comprise instructions for selecting from the set of contacts a first number of contacts having highest respective scores, wherein the scores are based on one or more interaction metrics.

28. The computer readable storage medium of claim 27, wherein the first number is based on a size of the display region.

29. The computer readable storage medium of claim 27, wherein the instructions for selecting the second subset comprise instructions for selecting from the set of contacts excluding the first subset a second number of contacts having highest respective scores and satisfying predefined activity criteria.

30. The computer readable storage medium of claim 29, wherein the second number is based on a size of the display region.

31. A computer-implemented method of selecting contacts in an electronic messaging system for presentation in a display region, comprising on a computer system having one or more processors and memory storing programs executed by the one or more processors:

identifying a set of contacts of a user;

selecting a first subset of one or more contacts from the set of contacts in accordance with first predefined criteria, the first predefined criteria comprising contact interaction criteria based on quantity of prior electronic messaging communications between the user and contacts in the set of contacts;

selecting a second subset of one or more contacts from the set of contacts based on second different predefined criteria comprising online status criteria; and generating for simultaneous presentation in a display region a list of contacts including contacts from both the first and second subsets of contacts, wherein the contacts in the list of contacts are selected so as to include at least one contact that is not included in the first subset and at least one contact that is not included in the second subset;

wherein the integrated list of contacts includes, for respective contacts in the integrated list, indicia of current status of the respective contacts, and the contacts in the integrated list of contacts are ordered in accordance with predefined criteria.

32. The method of claim 1, wherein identifying the set of contacts of the user further comprises identifying the set of contacts in an address book for the user that is stored at the computer system.

33. The method of claim 2, wherein identifying the set of contacts of the user further comprises identifying the set of contacts in an address book for the user that is stored at the computer system.

34. The computer readable storage medium of claim 18, wherein identifying the set of contacts of the user further comprises identifying the set of contacts in an address book for the user that is stored at the computer system.

35. The method of claim 31, wherein identifying the set of contacts of the user further comprises identifying the set of contacts in an address book for the user that is stored at the computer system.

36. The system of claim 16, wherein identifying the set of contacts of the user further comprises identifying the set of contacts in an address book for the user that is stored at the computer system.

37. The system of claim 16, wherein the first predefined criteria comprises both the contact interaction criteria and a requirement that each selected contact in the first subset satisfy a query string in a received query.

38. The system of claim 16, wherein the second predefined criteria comprise predefined user activity criteria.

39. The system of claim 16, wherein the instructions for selecting the second subset of contacts comprise instructions for selecting contacts from a set of contacts that excludes the first subset of contacts.

40. The system of claim 16, the one or more modules further comprising instructions for:
   selecting a third subset of one or more contacts from the set of contacts excluding the first and second subsets based on third predefined criteria;
   wherein the instructions for generating the integrated list of contacts include instructions for generating for presentation in the display region the integrated list of contacts from the first, second, and third subsets.

41. The system of claim 40, wherein the third predefined criteria comprises predefined connectedness criteria.

42. The system of claim 40, wherein the instructions for generating an integrated list of contacts from the first, second, and third subsets comprise instructions for combining and reordering the first, second, and third subsets.

43. The system of claim 16, wherein the instructions for identifying the set of contacts further comprise instructions for determining a score for each contact in the set of contacts.

44. The system of claim 43, wherein the instructions for determining the score comprise instructions for determining the score for each contact in the set of contacts based on one or more interaction metrics with respect to the respective contact.

45. The system of claim 43, wherein the instructions for selecting the first subset comprise instructions for selecting from the set of contacts a first number of contacts having highest respective scores, wherein the scores are based on one or more interaction metrics.

46. The system of claim 45, wherein the first number is based on a size of the display region.

47. The system of claim 45, wherein the instructions for selecting the second subset comprise instructions for selecting from the set of contacts excluding the first subset a second number of contacts having highest respective scores and satisfying predefined activity criteria.

48. The system of claim 47, wherein the second number is based on a size of the display region.

* * * * *